US009741377B1

(12) United States Patent
Sasaki et al.

(10) Patent No.: US 9,741,377 B1
(45) Date of Patent: *Aug. 22, 2017

(54) THERMALLY-ASSISTED MAGNETIC RECORDING HEAD INCLUDING A MAIN POLE AND A PLASMON GENERATOR

(71) Applicant: HEADWAY TECHNOLOGIES, INC., Milpitas, CA (US)

(72) Inventors: Yoshitaka Sasaki, Los Gatos, CA (US); Hiroyuki Ito, Milpitas, CA (US); Shigeki Tanemura, Milpitas, CA (US); Hideo Mamiya, Milpitas, CA (US); Seiichiro Tomita, Milpitas, CA (US); Hironori Araki, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,321

(22) Filed: Feb. 23, 2016

(51) Int. Cl.
| | | |
|---|---|---|
| *G11B 11/00* | (2006.01) | |
| *G11B 5/48* | (2006.01) | |
| *G11B 5/127* | (2006.01) | |
| *G11B 5/00* | (2006.01) | |
| *G11B 5/31* | (2006.01) | |
| *G11B 5/60* | (2006.01) | |
| *G11B 7/1387* | (2012.01) | |

(52) U.S. Cl.
CPC .......... *G11B 5/4866* (2013.01); *G11B 5/1272* (2013.01); *G11B 5/314* (2013.01); *G11B 5/6088* (2013.01); *G11B 7/1387* (2013.01); *G11B 2005/001* (2013.01); *G11B 2005/0005* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,068,453 B2 | 6/2006 | Terris et al. | |
| 8,400,884 B1 * | 3/2013 | Araki .................. | G11B 5/3163 369/13.33 |
| 8,456,968 B1 | 6/2013 | Sasaki et al. | |
| 8,482,879 B1 | 7/2013 | Sasaki et al. | |
| 8,493,821 B1 * | 7/2013 | Sasaki .................. | G11B 5/1278 369/13.13 |
| 8,614,932 B1 | 12/2013 | Sasaki et al. | |

(Continued)

OTHER PUBLICATIONS

U.S. Appl. No. 14/720,319, filed May 22, 2015 in the name of Sasaki et al.

(Continued)

Primary Examiner — Tan X Dinh
(74) Attorney, Agent, or Firm — Oliff PLC

(57) ABSTRACT

A thermally-assisted magnetic recording head includes a main pole and a plasmon generator. The plasmon generator includes a first material portion and a second material portion formed of different materials. The first material portion is located away from the medium facing surface. The second material portion includes a near-field light generating surface. The main pole has a front end face including a first end face portion and a second end face portion. The near-field light generating surface, the first end face portion and the second end face portion are arranged in this order along the direction of travel of a recording medium.

17 Claims, 32 Drawing Sheets

(56) References Cited

U.S. PATENT DOCUMENTS

| | | | |
|---|---|---|---|
| 8,705,327 B2 | 4/2014 | Matsumoto | |
| 8,760,809 B1 * | 6/2014 | Sasaki | G11B 5/314 369/13.33 |
| 8,792,207 B1 | 7/2014 | Sasaki et al. | |
| 9,218,827 B1 | 12/2015 | Sasaki et al. | |
| 9,218,835 B1 | 12/2015 | Sasaki et al. | |
| 2011/0170381 A1 | 7/2011 | Matsumoto | |
| 2012/0257304 A1 | 10/2012 | Sasaki et al. | |
| 2014/0247706 A1 * | 9/2014 | Sasaki | G11B 13/08 369/13.33 |
| 2014/0269237 A1 * | 9/2014 | Sasaki | B23K 10/00 369/13.24 |
| 2015/0071044 A1 | 3/2015 | Sasaki et al. | |
| 2015/0124575 A1 * | 5/2015 | Sasaki | G11B 5/3133 369/13.33 |
| 2015/0255096 A1 * | 9/2015 | Sasaki | G11B 5/4866 369/13.33 |
| 2015/0262593 A1 | 9/2015 | Sasaki et al. | |
| 2015/0332717 A1 | 11/2015 | Hara et al. | |
| 2016/0343391 A1 * | 11/2016 | Sasaki | G11B 5/315 369/13.33 |

OTHER PUBLICATIONS

U.S. Appl. No. 14/825,020, filed Aug. 12, 2015 in the name of Sasaki et al.
Apr. 29, 2016 Office Action Issued in U.S. Appl. No. 14/720,319.
Aug. 10, 2016 Office Action issued in U.S. Appl. No. 14/825,020.
Nov. 23, 2016 Office Action issued in U.S. Appl. No. 14/825,020.

* cited by examiner

THERMALLY-ASSISTED MAGNETIC RECORDING HEAD INCLUDING A MAIN POLE AND A PLASMON GENERATOR

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium. The medium facing surface has an air inflow end (a leading end) and an air outflow end (a trailing end).

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, disadvantageously reduces the thermal stability of magnetization of the magnetic fine particles. To resolve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To resolve the foregoing problems, there has been proposed a technology called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0170381 A1 discloses a thermally-assisted magnetic recording head including a main pole, a waveguide and a plasmon generator. The main pole has an end face located in the medium facing surface, and produces a write magnetic field from this end face. The plasmon generator has an end face located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that occurs on the surface of the core based on the light propagating through the core, and to cause near-field light to be generated from the end face of the plasmon generator based on the excited surface plasmons.

In a thermally-assisted magnetic recording head, the plasmon generator and the main pole become hot due to heat generated by the plasmon generator. This results in the problem of deformation or breakage of the plasmon generator, thus shortening the life of the thermally-assisted magnetic recording head.

One of solutions to the aforementioned problem is to construct the plasmon generator to include a first metal portion and a second metal portion that are formed of different metal materials, as disclosed in U.S. Patent Application Publication No. 2011/0170381 A1. The first metal portion is not exposed in the medium facing surface, whereas the second metal portion is exposed in the medium facing surface. The aforementioned problem can be resolved by, for example, forming the second metal portion of a metal material harder than that of a metal material used to form the first metal portion.

To achieve higher recording density, it is necessary to make the track width smaller by reducing at least one of the width of the end face of the plasmon generator in the medium facing surface and the width of the end face of the main pole in the medium facing surface. As the track width is reduced, it becomes more important to bring the end face of the plasmon generator and the end face of the main pole into precise alignment with each other.

U.S. Patent Application Publication No. 2011/0170381 A1 discloses a technique to form a plasmon generator by etching a metal layer using either the main pole or a mask for use to etch the main pole. This technique allows for precise alignment of the end face of the plasmon generator and the end face of the main pole with each other. When employing this technique, however, any attempts to reduce the track width would result in a reduction in the width of the end face of the main pole, and this would cause the main pole to become unable to pass much magnetic flux and thus unable to produce a write magnetic field of sufficient magnitude from its end face. A further problem with the aforementioned technique is that it is difficult to permit a desired sizing of the width of the end face of the main pole without limitations imposed by the width of the end face of the plasmon generator.

OBJECT AND SUMMARY OF THE INVENTION

It is an object of the present invention to provide a thermally-assisted magnetic recording head and its manufacturing method allowing for improvement in the reliability of a plasmon generator, precise alignment of the end face of the plasmon generator and the end face of the main pole with each other, and a desired sizing of the width of the end face of the main pole without limitations imposed by the width of the end face of the plasmon generator.

A thermally-assisted magnetic recording head of the present invention includes: a medium facing surface configured to face a recording medium; a main pole; a waveguide; a plasmon generator; a surrounding layer; and a gap film. The main pole produces a write magnetic field for use to write data on the recording medium. The waveguide includes a core and a cladding. The core allows light to propagate therethrough. The cladding is provided around the core. The plasmon generator has a near-field light generating surface located in the medium facing surface. The gap film separates the plasmon generator from the surrounding layer.

The plasmon generator includes a first material portion formed of a first material, and a second material portion formed of a second material different from the first material. The first material portion is located away from the medium facing surface. The second material portion includes the near-field light generating surface. The plasmon generator is configured to excite a surface plasmon on the first material portion based on the light propagating through the core, and to generate near-field light from the near-field light generating surface based on the surface plasmon.

The main pole has a front end face located in the medium facing surface. The front end face includes a first end face portion, and a second end face portion contiguous with the first end face portion. The second end face portion is greater than the first end face portion in width in the track width direction. The near-field light generating surface, the first end face portion and the second end face portion are arranged in this order along the direction of travel of the recording medium. The main pole includes a first portion and a second portion, the first portion including the first end face portion, the second portion including the second end face portion.

The surrounding layer has a first surrounding layer end face and a second surrounding layer end face, both located in the medium facing surface. The first surrounding layer end face and the second surrounding layer end face are located on opposite sides of at least part of the first end face portion in the track width direction so that the at least part of the first end face portion is interposed between the first and second surrounding layer end faces. The gap film has a first gap film end face and a second gap film end face, both located in the medium facing surface. The first gap film end face and the second gap film end face are located on opposite sides of at least part of the near-field light generating surface in the track width direction so that the at least part of the near-field light generating surface is interposed between the first and second gap film end faces. Each of the first and second gap film end faces includes a portion located between the first and second surrounding layer end faces, but does not include any portion interposed between the first surrounding layer end face and the first end face portion or between the second surrounding layer end face and the first end face portion.

In the thermally-assisted magnetic recording head of the present invention, the first material may be one of Ag, Au, Al and Cu, and the second material may be a metal material having a Vickers hardness higher than that of the first material.

In the thermally-assisted magnetic recording head of the present invention, the second material portion may include a ring portion shaped like a ring, and a narrow portion protruding from the ring portion. The ring portion is located away from the medium facing surface. The narrow portion includes the near-field light generating surface. The narrow portion is smaller than the ring portion in maximum width in the track width direction. At least part of the first material portion lies inside the ring portion.

When the second material portion includes the ring portion and the narrow portion, the first material portion may include a first layer portion and a second layer portion. The core, the first layer portion and the second layer portion are arranged in this order along the direction of travel of the recording medium. The second layer portion lies inside the ring portion.

The thermally-assisted magnetic recording head of the present invention may further include an insulating section formed of an insulating material. The first material portion may include a first layer portion and a second layer portion. The core, the first layer portion and the second layer portion are arranged in this order along the direction of travel of the recording medium. The insulating section is located between the first layer portion and the medium facing surface. The second material portion is located between the second layer portion and the medium facing surface. The insulating section and the second material portion are arranged in this order along the direction of travel of the recording medium. The second material portion is smaller than the second layer portion in maximum width in the track width direction.

The thermally-assisted magnetic recording head of the present invention may further include a separating film for separating the main pole from the surrounding layer. The separating film is a single continuous film, and at least part of the separating film is interposed between the main pole and the plasmon generator, between the main pole and the surrounding layer, and between the main pole and the gap film.

In the thermally-assisted magnetic recording head of the present invention, the surrounding layer may be formed of a nonmagnetic metal material.

In the thermally-assisted magnetic recording head of the present invention, the surrounding layer may include a first side shield and a second side shield each formed of a magnetic material. The first side shield has a first side shield end face constituting at least part of the first surrounding layer end face. The second side shield has a second side shield end face constituting at least part of the second surrounding layer end face.

In the thermally-assisted magnetic recording head of the present invention, the core may have an evanescent light generating surface for generating evanescent light based on the light propagating through the core, and the first material portion may have a plasmon exciting section located at a predetermined distance from the evanescent light generating surface and facing the evanescent light generating surface. In this case, in the plasmon generator, a surface plasmon is excited on the plasmon exciting section through coupling with the evanescent light generated by the evanescent light generating surface, the surface plasmon propagates to the near-field light generating surface, and the near-field light generating surface generates near-field light based on the surface plasmon.

In the thermally-assisted magnetic recording head of the present invention, the front end face of the main pole may be located on the front side in the direction of travel of the recording medium relative to the near-field light generating surface.

A manufacturing method for the thermally-assisted magnetic recording head of the present invention includes the steps of: forming the waveguide; forming the plasmon generator; forming the surrounding layer and the gap film after the plasmon generator is formed; and forming the main pole after the surrounding layer and the gap film are formed.

The step of forming the plasmon generator includes the steps of: forming an initial plasmon generator; forming an etching mask for use to pattern the initial plasmon generator; and etching the initial plasmon generator by using the etching mask so that the initial plasmon generator becomes the plasmon generator.

The step of forming the surrounding layer and the gap film includes: the step of forming an initial gap film to cover the plasmon generator and the etching mask after the step of etching the initial plasmon generator; the step of forming the surrounding layer after the initial gap film is formed; and the removal step of removing a portion of the initial gap film and at least a portion of the etching mask after the surrounding layer is formed. The removal step makes the initial gap film into the gap film and results in the formation of a structure having a recess, the structure including the plasmon generator, the surrounding layer and the gap film. The main pole is formed such that at least part of the first portion is received in the recess.

In the manufacturing method of the present invention, the second material portion may include a ring portion shaped like a ring, and a narrow portion protruding from the ring portion. The ring portion is located away from the medium facing surface. The narrow portion includes the near-field light generating surface. The narrow portion is smaller than the ring portion in maximum width in the track width direction. At least part of the first material portion lies inside the ring portion. In this case, the initial plasmon generator includes the first material portion and an initial second material portion. In the step of etching the initial plasmon generator, the initial second material portion is etched by using the etching mask so that the initial second material portion becomes the second material portion.

The thermally-assisted magnetic recording head manufactured by the manufacturing method of the present invention may further include an insulating section formed of an insulating material. The first material portion may include a first layer portion and a second layer portion. The core, the first layer portion and the second layer portion are arranged in this order along the direction of travel of the recording medium. The insulating section is located between the first layer portion and the medium facing surface. The second material portion is located between the second layer portion and the medium facing surface. The insulating section and the second material portion are arranged in this order along the direction of travel of the recording medium. The second material portion is smaller than the second layer portion in maximum width in the track width direction. In this case, the initial plasmon generator includes an initial first material portion and an initial second material portion. In the step of etching the initial plasmon generator, the initial first material portion and the initial second material portion may be etched by using the etching mask so that the initial first material portion becomes the first material portion and the initial second material portion becomes the second material portion.

The thermally-assisted magnetic recording head manufactured by the manufacturing method of the present invention may further include a separating film for separating the main pole from the surrounding layer. The separating film is a single continuous film, and at least part of the separating film is interposed between the main pole and the plasmon generator, between the main pole and the surrounding layer, and between the main pole and the gap film.

When the thermally-assisted magnetic recording head includes the separating film, the manufacturing method of the present invention may further include the step of forming the separating film on the structure after the removal step such that the separating film forms a receiving section corresponding to the recess. In this case, the main pole is formed on the separating film such that the first portion is received in the receiving section after the step of forming the separating film.

In the manufacturing method of the present invention, the removal step may employ wet etching to remove the portion of the initial gap film.

In the manufacturing method of the present invention, the step of forming the surrounding layer may include the steps of: forming an initial surrounding layer to cover the initial gap film; and polishing the initial surrounding layer until the etching mask is exposed. In this case, the step of forming the surrounding layer may further include the step of etching a portion of the initial surrounding layer after the step of polishing the initial surrounding layer.

In the present invention, the plasmon generator includes the first material portion and the second material portion which are formed of different materials. The first material portion is located away from the medium facing surface. The second material portion includes the near-field light generating surface. By virtue of these features, the present invention allows for improvement in the reliability of the plasmon generator.

The present invention makes it possible that the space between the first and second surrounding layer end faces in which at least part of the first end face portion lies can be adjusted by the width of the portion of each of the first and second gap film end faces located between the first surrounding layer end face and the second surrounding layer end face. The present invention thus allows for precise alignment of the near-field light generating surface and the first end face portion with each other, and also allows for a desired sizing of the width of the first end face portion without limitations imposed by the width of the near-field light generating surface.

Other and further objects, features and advantages of the present invention will appear more fully from the following description.

DETAILED DESCRIPTION OF THE PREFERRED EMBODIMENTS

First Embodiment

Figure 3:
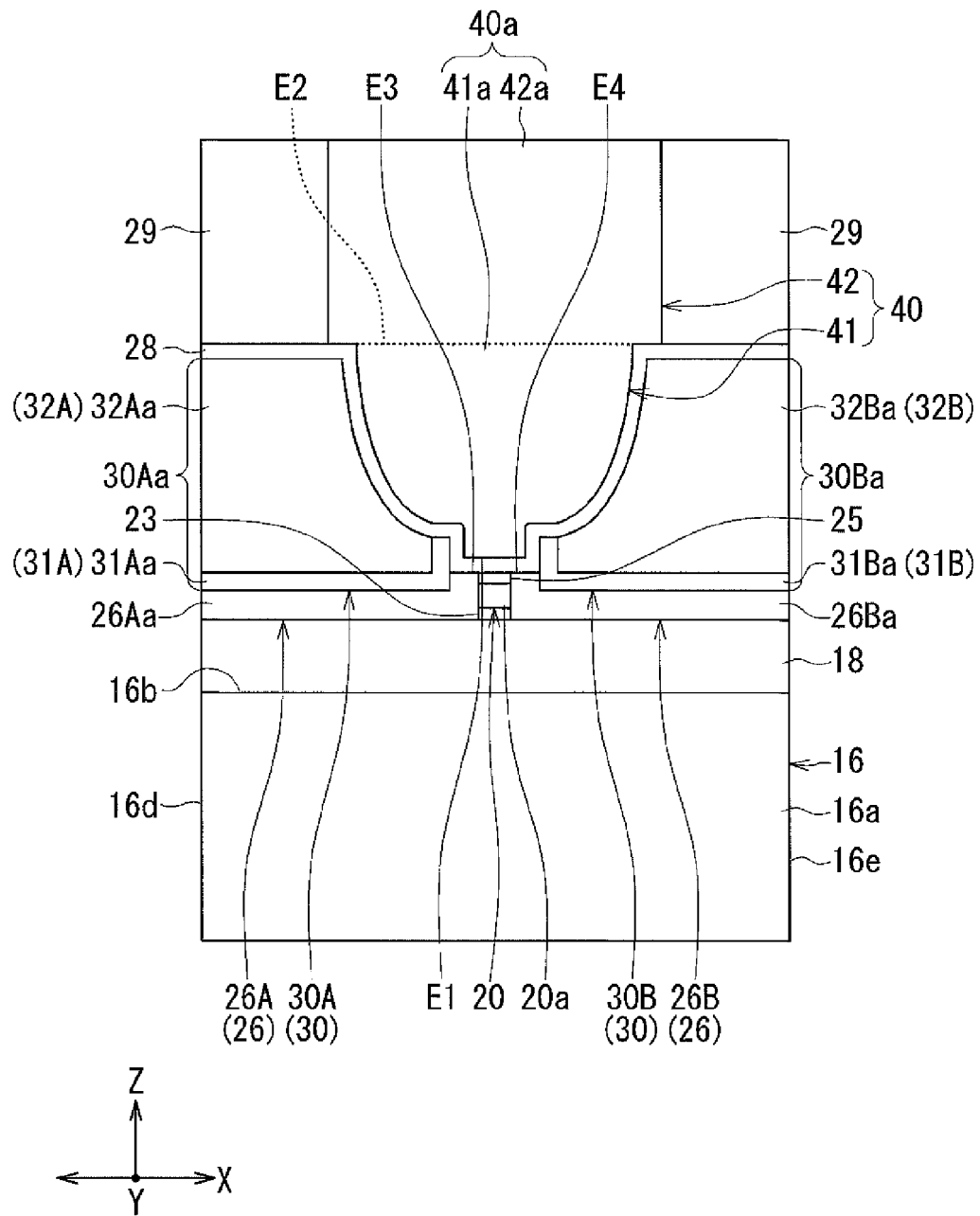
FIG. 3 is a front view showing the main part of a thermally-assisted magnetic recording head according to the first embodiment of the invention.
Figure 4:
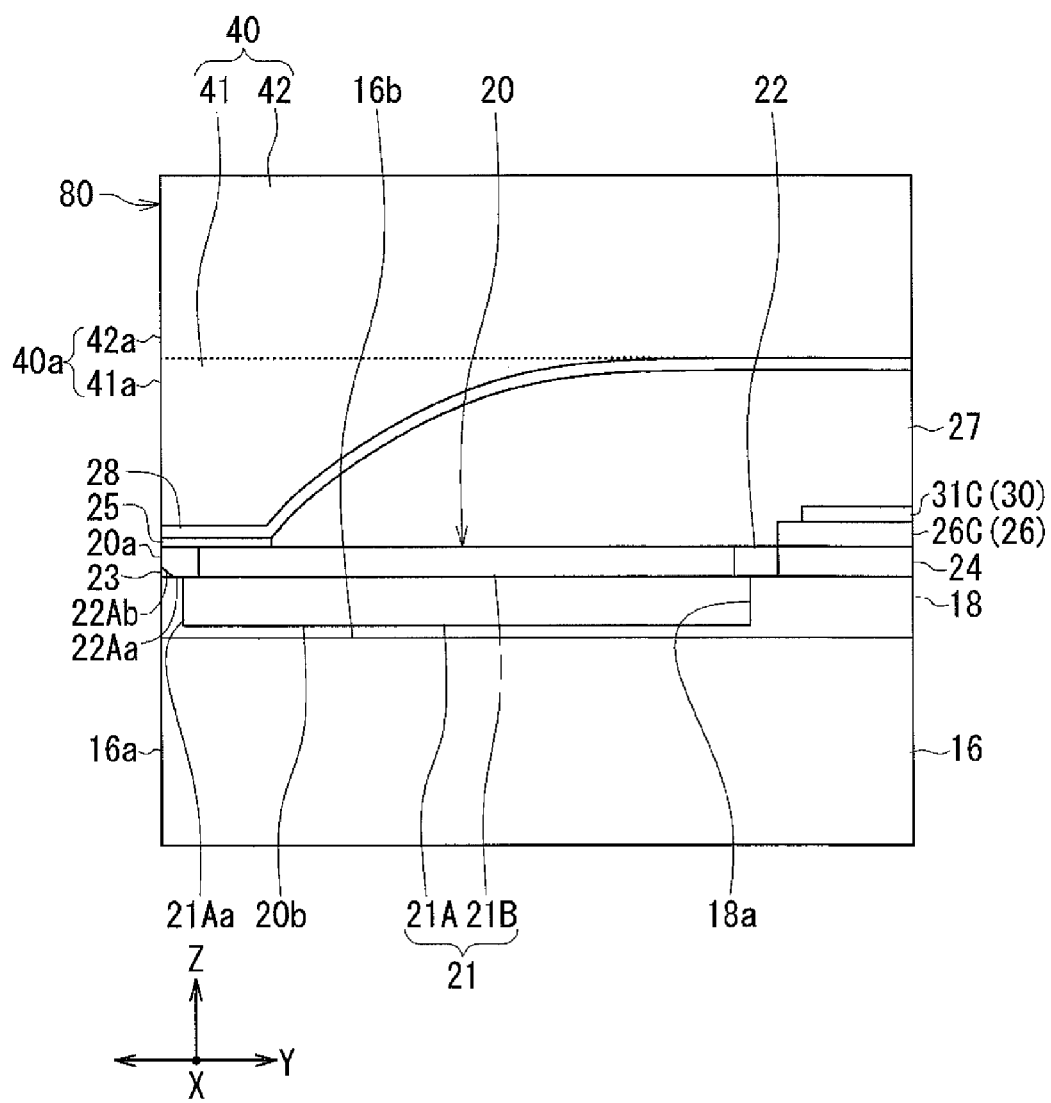
FIG. 4 is a cross-sectional view showing the main part of the thermally-assisted magnetic recording head according to the first embodiment of the invention.
Figure 5:
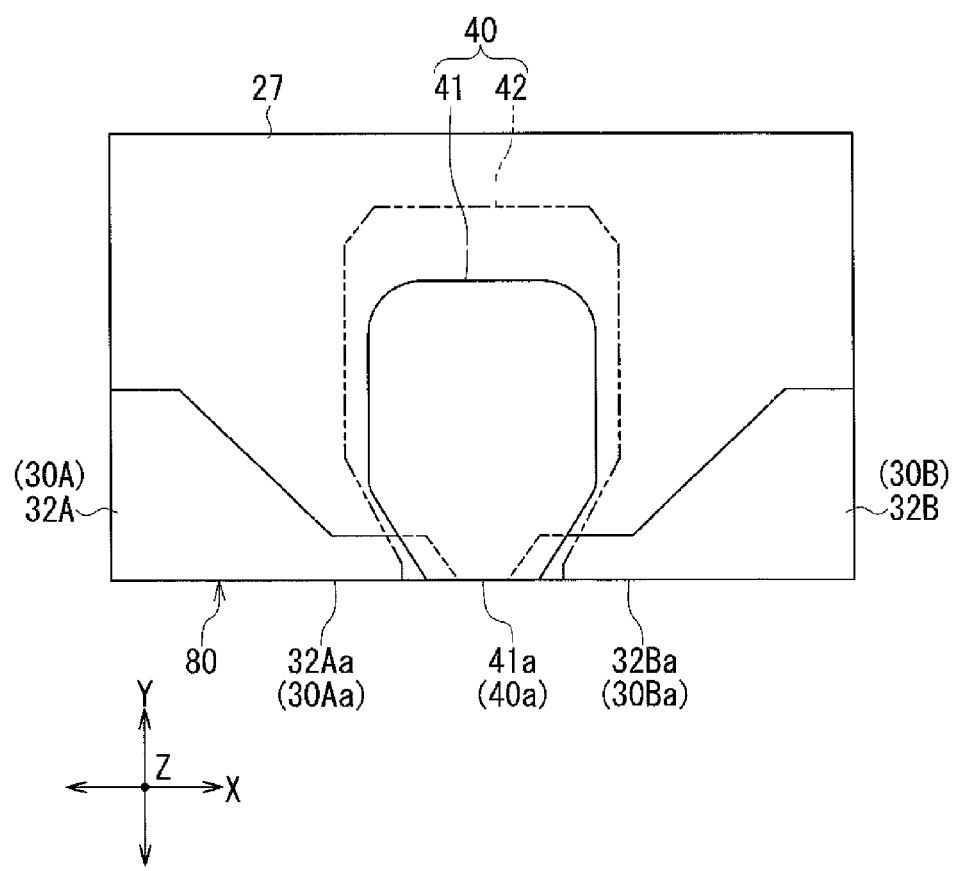
FIG. 5 is a plan view showing a main pole, a surrounding layer, and a first heat sink of the first embodiment of the invention.
Figure 6:
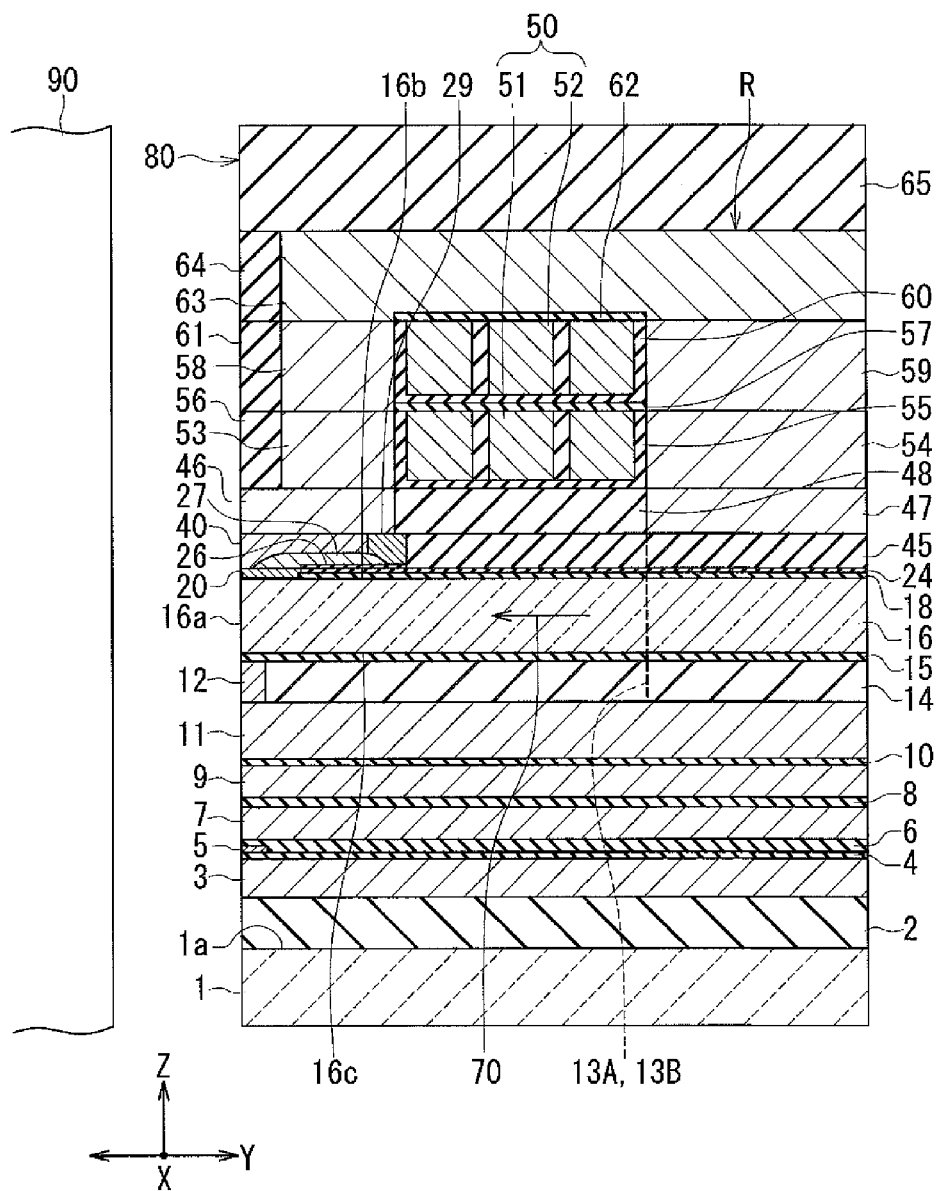
FIG. 6 is a cross-sectional view showing the configuration of the thermally-assisted magnetic recording head according to the first embodiment of the invention.
Figure 7:
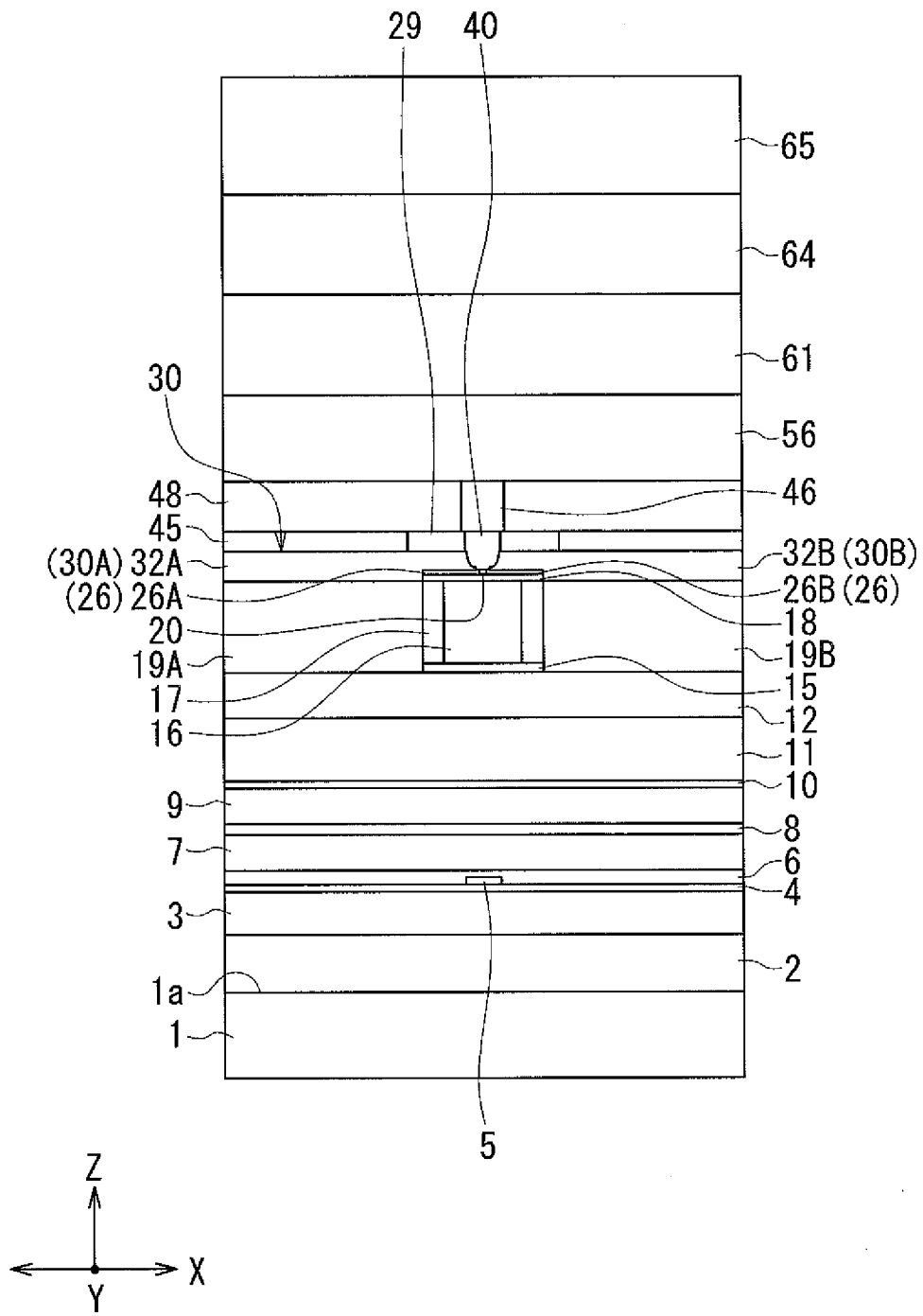
FIG. 7 is a front view showing the medium facing surface of the thermally-assisted magnetic recording head according to the first embodiment of the invention.
Figure 8:
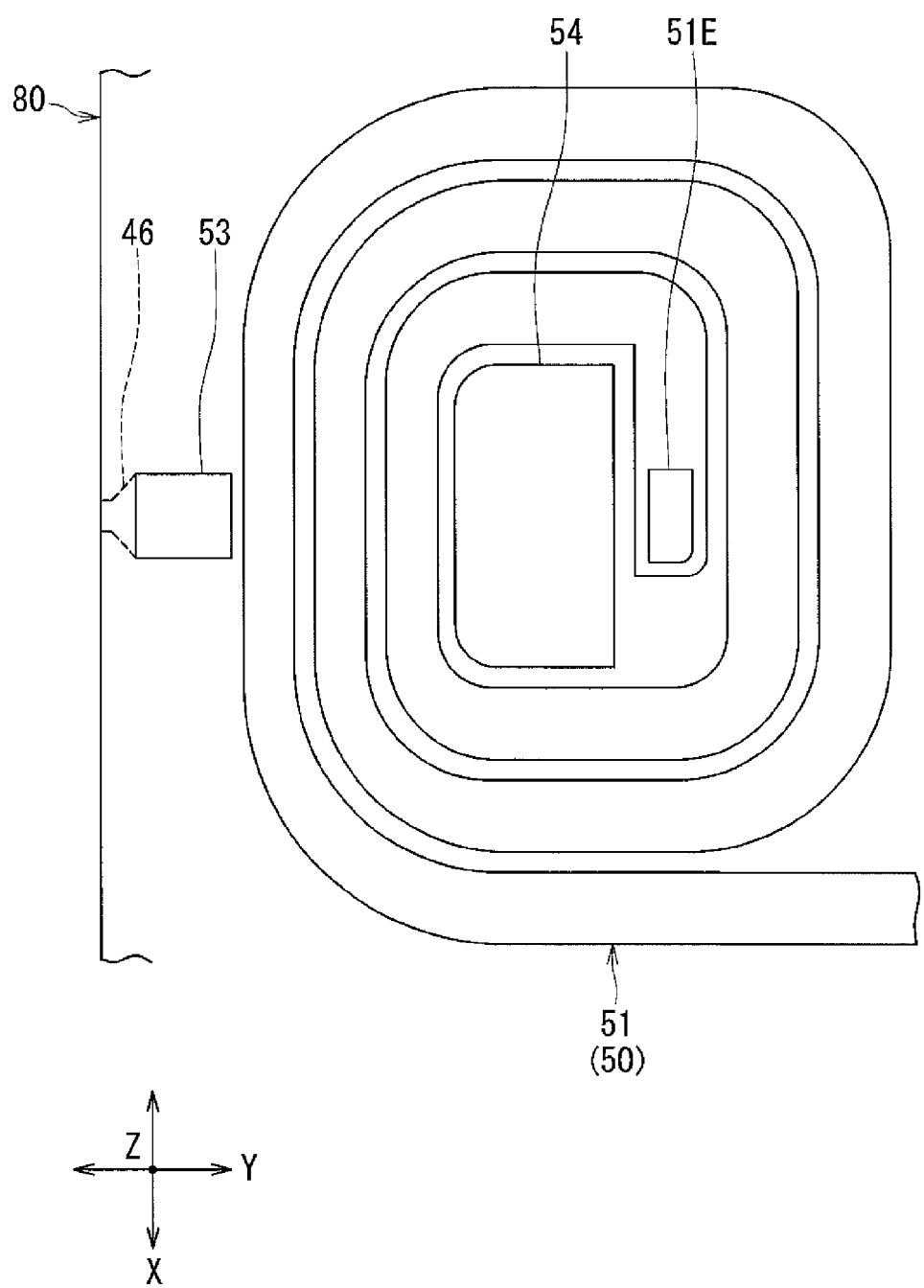
FIG. 8 is a plan view showing a first layer of a coil of the first embodiment of the invention.
Figure 9:
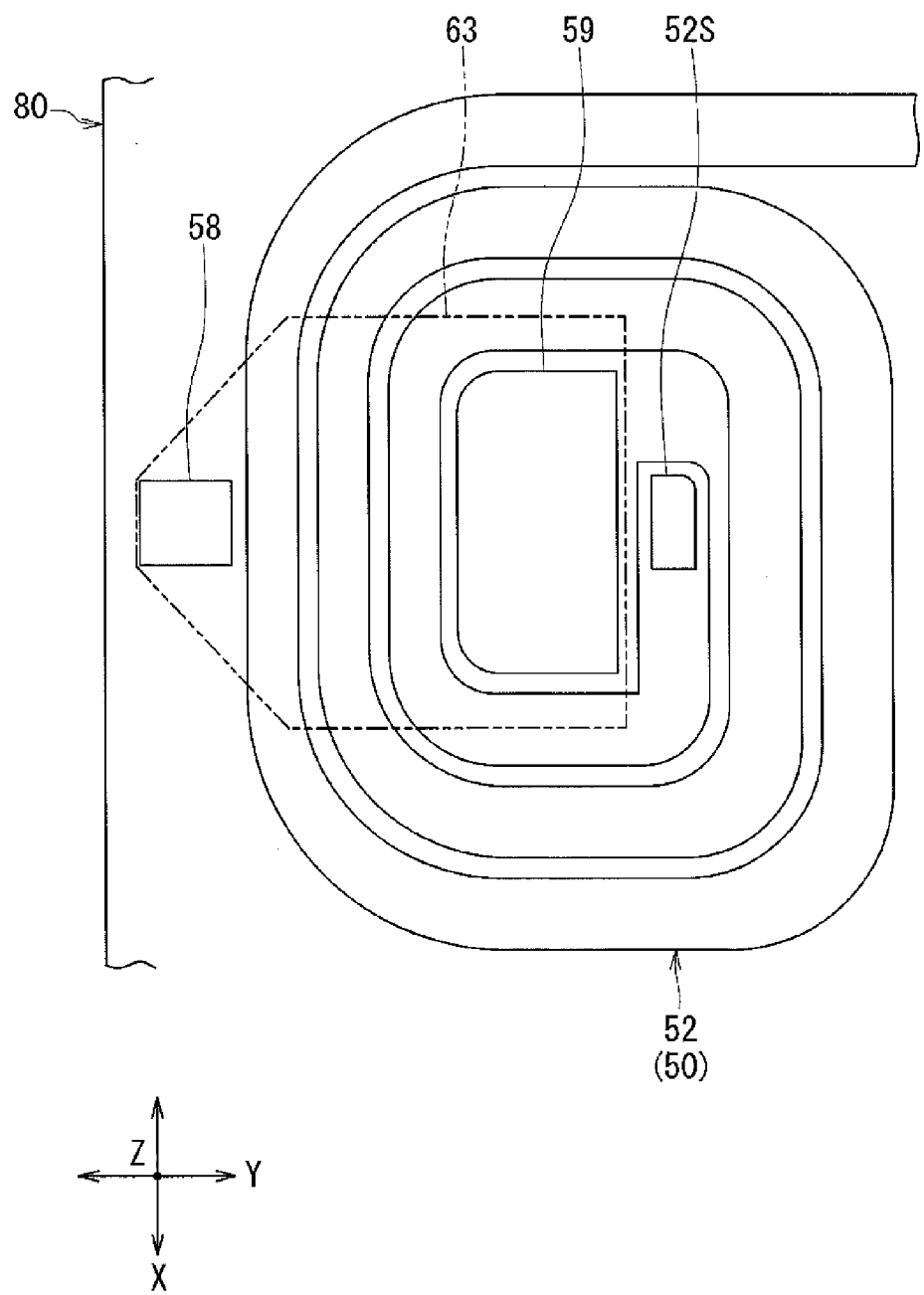
FIG. 9 is a plan view showing a second layer of the coil of the first embodiment of the invention.

Preferred embodiments of the present invention will now be described in detail with reference to the drawings. First, reference is made to FIG. 3 to FIG. 9 to describe the configuration of a thermally-assisted magnetic recording head according to a first embodiment of the invention. FIG. 3 is a front view showing the main part of the thermally-assisted magnetic recording head. FIG. 4 is a cross-sectional view showing the main part of the thermally-assisted magnetic recording head. FIG. 5 is a plan view showing a main pole, a surrounding layer, and a first heat sink. FIG. 6 is a cross-sectional view showing the configuration of the thermally-assisted magnetic recording head. FIG. 7 is a front view showing the medium facing surface of the thermally-assisted magnetic recording head. FIG. 8 is a plan view showing a first layer of a coil of the present embodiment. FIG. 9 is a plan view showing a second layer of the coil of the present embodiment.

The thermally-assisted magnetic recording head according to the present embodiment is intended for use in perpendicular magnetic recording, and is incorporated in a slider configured to fly over the surface of a rotating recording medium 90. The slider has a medium facing surface 80 configured to face the recording medium 90. When the recording medium 90 rotates, an airflow passing between the recording medium 90 and the slider causes a lift to be exerted on the slider. The lift causes the slider to fly over the surface of the recording medium 90.

As shown in FIG. 6, the thermally-assisted magnetic recording head has the medium facing surface 80. Here, we define X direction, Y direction, and Z direction as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 6 and FIG. 7, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 50 and a main pole 40. The coil 50 produces a magnetic field corresponding to data to be written on the recording medium 90. As shown in FIG. 3 to FIG. 5, the main pole 40 has a front end face 40a located in the medium facing surface 80. The main pole 40 is configured to pass a magnetic flux corresponding to the magnetic field produced by the coil 50, and to produce from the front end face 40a a write magnetic field for use to write data on the recording medium 90 by means of a perpendicular magnetic recording system. The coil 50 is formed of a conductive material such as copper.

The write head unit further includes a return path section R formed of a magnetic material. The return path section R includes a return pole layer 11, coupling layers 12, 19A, 19B, 46, 47, 53, 54, 58 and 59, two coupling sections 13A and 13B, and a yoke layer 63. The return pole layer 11 lies on the nonmagnetic layer 10. The return pole layer 11 has an end face located in the medium facing surface 80. The write head unit further includes a non-illustrated insulating layer provided around the return pole layer 11. The non-illustrated insulating layer is formed of alumina, for example.

The coupling layer 12 is located on a first portion of the top surface of the return pole layer 11, the first portion being near the medium facing surface 80. The coupling layer 12 has an end face located in the medium facing surface 80. The two coupling sections 13A and 13B are located on two second portions of the top surface of the return pole layer 11, the two second portions being located away from the medium facing surface 80. Each of the coupling sections 13A and 13B includes a first layer lying on the return pole layer 11, and a second and a third layer stacked in this order on the first layer. The first layer of the coupling section 13A and the first layer of the coupling section 13B are arranged to be adjacent in the track width direction (the X direction).

The write head unit further includes an insulating layer 14 lying on the non-illustrated insulating layer and a portion of the top surface of the return pole layer 11 other than the first and second portions. The first layers of the coupling sections 13A and 13B are embedded in the insulating layer 14. The insulating layer 14 is formed of alumina, for example.

The write head unit further includes a waveguide including a core 16 and a cladding. The core 16 allows light to propagate therethrough. The cladding is provided around the core 16. As shown in FIG. 3, FIG. 4, FIG. 6 and FIG. 7 in particular, the core 16 has a front end face 16a facing toward the medium facing surface 80, an evanescent light generating surface 16b which is a top surface, a bottom surface 16c, and two side surfaces 16d and 16e. The front end face 16a may be located in the medium facing surface 80 or at a distance from the medium facing surface 80. FIG. 3, FIG. 4, FIG. 6 and FIG. 7 show an example in which the front end face 16a is located in the medium facing surface 80.

The cladding includes cladding layers 15, 17 and 18. The cladding layer 15 lies on the coupling layer 12 and the insulating layer 14. The core 16 lies on the cladding layer 15. The cladding layer 17 lies on the cladding layer 15 and surrounds the core 16. The cladding layer 18 is disposed over the evanescent light generating surface 16b of the core 16 and the top surface of the cladding layer 17.

The core 16 is formed of a dielectric material that transmits laser light to be used for generating near-field light. The laser light emitted from a non-illustrated laser diode enters the core 16 and propagates through the core 16. The cladding layers 15, 17 and 18 are each formed of a dielectric material that has a refractive index lower than that of the core 16. For example, the core 16 may be formed of tantalum oxide such as $Ta_2O_5$ or silicon oxynitride (SiON), whereas the cladding layers 15, 17 and 18 may be formed of silicon oxide ($SiO_2$) or alumina.

The coupling layers 19A and 19B and the second layers of the coupling sections 13A and 13B are embedded in the cladding layers 15 and 17. The coupling layer 19A and the coupling layer 19B are located on opposite sides of the core 16 in the track width direction (the X direction) and spaced from the core 16. Each of the coupling layers 19A and 19D has an end face located in the medium facing surface 80, a top surface, and a bottom surface. The bottom surface of each of the coupling layers 19A and 19B is in contact with the coupling layer 12. The second layer of the coupling section 13A and the second layer of the coupling section 13B are located farther from the medium facing surface 80 than are the coupling layers 19A and 19B, and are located on opposite sides of the core 16 in the track width direction (the X direction), each being spaced from the core 16.

The write head unit further includes a plasmon generator 20 lying above the core 16 in the vicinity of the medium facing surface 80. The cladding layer 18 includes a receiving section 18a for receiving a part of the plasmon generator 20. The plasmon generator 20 is configured to excite surface plasmons on the principle to be described later. The plasmon generator 20 will be described in detail later.

The write head unit further includes dielectric layers 23 and 24 and an insulating film 25. The dielectric layer 23 is interposed between a part of the plasmon generator 20 and the medium facing surface 80. The dielectric layer 24 is located farther from the medium facing surface 80 than is the plasmon generator 20 and lies on the cladding layer 18. The insulating film 25 is located near the medium facing surface 80 and lies on a part of the plasmon generator 20. FIG. 6 and FIG. 7 omit the illustration of the dielectric layer 23 and the insulating film 25. The dielectric layers 23 and 24 are formed of the same material as the cladding layers 15, 17 and 18, for example. The insulating film 25 is formed of silicon oxide, for example.

The write head unit further includes a gap film 26 formed of an insulating material. As shown in FIG. 3 to FIG. 4, the gap film 26 includes a first portion 26A, a second portion 26B and a third portion 26C. The first portion 26A and the second portion 26B are located on opposite sides of the plasmon generator 20, the dielectric layer 23 and insulating film 25 in the track width direction (the X direction). The third portion 26C lies on the dielectric layer 24. The gap film 26 is formed of alumina, for example.

The write head unit further includes a surrounding layer 30 lying on a part of the gap film 26 in the vicinity of the medium facing surface 80. As shown in FIG. 3, the gap film 26 separates the plasmon generator 20 from the surrounding layer 30. Further, as shown in FIG. 3, FIG. 5 and FIG. 7, the surrounding layer 30 includes a first side portion 30A and a second side portion 30B. The first side portion 30A lies on the first portion 26A of the gap film 26. The second side portion 30B lies on the second portion 26B of the gap film 26.

The surrounding layer 30 includes a first side shield 32A and a second side shield 32B each formed of a magnetic material. The first side shield 32A is the principal part of the first side portion 30A. The second side shield 32B is the principal part of the second side portion 30B.

The surrounding layer 30 further includes a first nonmagnetic film 31A and a second nonmagnetic film 31B each formed of a nonmagnetic material. FIG. 7 omits the illustration of the first and second nonmagnetic films 31A and 31B. The first side portion 30A is constituted by the first side shield 32A and the first nonmagnetic film 31A. The second side portion 30B is constituted by the second side shield 32B and the second nonmagnetic film 31B. For example, Ru or Rh can be used as the nonmagnetic material for forming the first and second nonmagnetic films 31A and 31B.

The first nonmagnetic film 31A lies on the first portion 26A of the gap film 26. The first portion 26A and the first nonmagnetic film 31A have their respective openings for exposing the top surface of the coupling layer 19A. The first side shield 32A lies on the first nonmagnetic film 31A and contacts the top surface of the coupling layer 19A through the openings of the first portion 26A and the first nonmagnetic film 31A.

The second nonmagnetic film 31B lies on the second portion 26B of the gap film 26. The second portion 26B and the second nonmagnetic film 31B have their respective openings for exposing the top surface of the coupling layer 19B. The second side shield 32B lies on the second nonmagnetic film 31B and contacts the top surface of the coupling layer 19B through the openings of the second portion 26B and the second nonmagnetic film 31B.

The surrounding layer 30 further includes a third nonmagnetic film 31C formed of a nonmagnetic material. FIG. 6 omits the illustration of the third nonmagnetic film 31C. The third nonmagnetic film 31C lies on the third portion 26C of the gap film 26. The third nonmagnetic film 31C is formed of the same material as the first and second nonmagnetic films 31A and 31B.

The write head unit further includes a first heat sink 27 located away from the medium facing surface 80 and lying on the plasmon generator 20 and the third nonmagnetic film 31C. The first heat sink 27 is formed of Au or Cu, for example.

The main pole 40 is located on the front side in the direction of travel of the recording medium 90 relative to the core 16. The plasmon generator 20 is located between the core 16 and the main pole 40. The write head unit further includes a separating film 28 formed of a nonmagnetic material and lying on the insulating film 25, the gap film 26, the surrounding layer 30 and the first heat sink 27. FIG. 6 and FIG. 7 omit the illustration of the separating film 28. The main pole 40 lies on the separating film 28. As shown in FIG. 3, the separating film 28 separates the main pole 40 from the surrounding layer 30. As shown in FIG. 3 and FIG. 4, the separating film 28 is a single continuous film, and at least part of the separating film 28 is interposed between the main pole 40 and the plasmon generator 20, between the main pole 40 and the surrounding layer 30, and between the main pole 40 and the gap film 26. The insulating film 25 is interposed between the separating film 28 and the plasmon generator 20 in the vicinity of the medium facing surface 80. As shown in FIG. 4, the separating film 28 includes a portion interposed between the main pole 40 and the first heat sink 27.

The nonmagnetic material used to form the separating film 28 may be an insulating material or a nonmagnetic metal material. An example of an insulating material that can be used to form the separating film 28 is alumina or silicon oxide. An example of a nonmagnetic metal material that can be used to form the separating film 28 is Ru or Rh. In the present embodiment, the separating film 28 is formed of a nonmagnetic metal material, in particular.

The main pole 40 includes a first portion 41 and a second portion 42. Part of the first portion 41 is located between the first side portion 30A and the second side portion 30B of the surrounding layer 30. The second portion 42 is located on the front side in the Z direction or the direction of travel of the recording medium 90 relative to the first portion 41. In FIG. 3 and FIG. 4, the boundary between the first portion 41 and the second portion 42 is indicated by a dotted line. Part of the second portion 42 lies over the surrounding layer 30 with the separating film 28 interposed between the part of the second portion 42 and the surrounding layer 30.

The write head unit further includes a second heat sink 29 provided around the second portion 42 of the main pole 40, and a first nonmagnetic metal film (not illustrated) interposed between the second heat sink 29 and the second portion 42. The separating film 28 and the first nonmagnetic metal film are interposed between the surrounding layer 30 and the second heat sink 29 and between the first heat sink 27 and the second heat sink 29. The first nonmagnetic metal film has the function of preventing the material of the second heat sink 29 from diffusing into the main pole 40. The first nonmagnetic metal film is formed of Ru, Cr, Zr, Ti or Ta, for example.

The second heat sink 29 is formed of the same material as the first heat sink 27, for example. The first and second heat sinks 27 and 29 and the surrounding layer 30 have the function of dissipating heat generated by the plasmon generator 20 outwardly from the plasmon generator 20 and the main pole 40. The separating film 28 includes a portion interposed between the main pole 40 and the plasmon generator 20. The separating film 28 is in contact with the first heat sink 27 and the surrounding layer 30 and connected to the second heat sink 29 via the first nonmagnetic metal film. Thus, when the separating film 28 is formed of a high thermal conductivity material such as nonmagnetic metal, the heat generated by the plasmon generator 20 can be transferred to the second heat sink 29 and the surrounding layer 30 by the separating film 28. This allows the above-described effect of the first and second heat sinks 27 and 29 and the surrounding layer 30 to be markedly exerted.

The write head unit further includes a dielectric layer 45 provided around the surrounding layer 30 and the first and second heat sinks 27 and 29. The dielectric layer 45 is formed of the same material as the cladding layers 15, 17 and 18, for example.

The third layers of the coupling sections 13A and 13B are embedded in the cladding layer 18, the dielectric layers 24 and 45 and the gap film 26. The coupling layer 47 lies on the third layers of the coupling sections 13A and 13B and the dielectric layer 45.

The coupling layer 46 lies on the main pole 40, the second heat sink 29 and the dielectric layer 45. The coupling layer 46 has an end face located in the medium facing surface 80. The coupling layer 46 may include a narrow portion and a wide portion as shown in FIG. 8, the narrow portion having the aforementioned end face of the coupling layer 46 and an end opposite thereto, the wide portion being connected to the end of the narrow portion. The wide portion is greater than the narrow portion in width in the track width direction (the X direction). The width of the narrow portion in the track width direction is substantially constant regardless of distance from the medium facing surface 80. The width of the wide portion in the track width direction is equal to that of the narrow portion at the boundary between the narrow portion and the wide portion, and gradually increases with increasing distance from the medium facing surface 80, then becoming constant.

The write head unit further includes a second nonmagnetic metal film (not illustrated) interposed between the second heat sink 29 and the coupling layer 46, and a dielectric layer 48 provided around the coupling layers 46 and 47. The second nonmagnetic metal film has the function of preventing the material of the second heat sink 29 from diffusing into the coupling layer 46. The second nonmagnetic metal film is formed of the same material as the first nonmagnetic metal film. The dielectric layer 48 is formed of the same material as the cladding layers 15, 17 and 18, for example.

The coupling layer 53 lies on the coupling layer 46. The coupling layer 53 has an end face facing toward the medium facing surface 80 and located at a distance from the medium facing surface 80. The coupling layer 54 lies on the coupling layer 47.

The coil 50 includes a first layer 51 and a second layer 52. As shown in FIG. 8, the first layer 51 is wound around the coupling layer 54. The write head unit further includes an insulating film 55, an insulating layer 56 and an insulating layer 57. The insulating film 55 is interposed between the first layer 51 and each of the coupling layers 53 and 54 and the dielectric layer 48. The insulating layer 56 is disposed around the first layer 51 and the coupling layer 53 and in the space between adjacent turns of the first layer 51. The insulating layer 57 lies on the first layer 51, the insulating film 55 and the insulating layer 56. The insulating film 55 and the insulating layers 56 and 57 are formed of alumina, for example.

The coupling layer 58 lies on the coupling layer 53. The coupling layer 58 has an end face facing toward the medium facing surface 80 and located at a distance from the medium facing surface 80. The coupling layer 59 lies on the coupling layer 54.

The second layer 52 of the coil 50 lies above the first layer 51. As shown in FIG. 9, the second layer 52 is wound around the coupling layer 59. The write head unit further includes an insulating film 60, an insulating layer 61 and an insulating layer 62. The insulating film 60 is interposed between the second layer 52 and each of the coupling layers 58 and 59 and the insulating layer 57. The insulating layer 61 is disposed around the second layer 52 and the coupling layer 58 and in the space between adjacent turns of the second layer 52. The insulating layer 62 lies on the second layer 52, the insulating film 60 and the insulating layer 61. The insulating film 60 and the insulating layers 61 and 62 are formed of alumina, for example.

The yoke layer 63 lies on the coupling layers 58 and 59 and the insulating layer 62. The yoke layer 63 has an end face facing toward the medium facing surface 80 and located at a distance from the medium facing surface 80. The write head unit further includes an insulating layer 64 disposed around the yoke layer 63. The insulating layer 64 is formed of alumina, for example.

As shown in FIG. 6 and FIG. 7, the thermally-assisted magnetic recording head further includes a protective layer 65 disposed to cover the write head unit. The protective layer 65 is formed of alumina, for example.

As has been described, the thermally-assisted magnetic recording head according to the present embodiment includes the medium facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the coil 50, the main pole 40, the waveguide, the plasmon generator 20, the surrounding layer 30, the gap film 26, and the separating film 28. The waveguide includes the core 16 and the cladding. The cladding includes the cladding layers 15, 17 and 18. The surrounding layer 30 includes the first and second side shields 32A and 32B.

The write head unit further includes the return path section R. The return path section R connects the main pole 40 to the first and second side shields 32A and 32B, and passes a magnetic flux corresponding to the magnetic field produced by the coil 50.

The first and second side shields 32A and 32B capture a disturbance magnetic field applied to the thermally-assisted magnetic recording head from the outside thereof. This makes it possible to prevent the disturbance magnetic field from being intensively captured into the main pole 40 and causing erroneous writing on the recording medium 90. The first and second side shields 32A and 32B have the function of capturing a magnetic flux that is produced from the front end face 40a of the main pole 40 and spreads in the track width direction, and thereby preventing the magnetic flux from reaching the recording medium 90. As a result, it becomes possible to sharpen the distribution of strength of the write magnetic field in the track width direction. This in turn makes it possible to reduce the track width and thereby increase the track density. Further, the sharpened distribution of strength of the write magnetic field in the track width direction allows for the formation of a magnetization transition region into a shape approximating a rectilinear shape, rather than a curved shape, on the recording medium 90. It is thereby possible to achieve higher linear recording density. Further, the first and second side shields 32A and 32B and the return path section R have the function of allowing a magnetic flux that has been produced from the front end face 40a of the main pole 40 and has magnetized a portion of the recording medium 90 to flow back to the main pole 40.

The shape and location of the coil 50 will now be described in detail with reference to FIG. 8 and FIG. 9. As shown in FIG. 8, the first layer 51 of the coil 50 is wound approximately three times around the coupling layer 54. The first layer 51 includes a portion extending to pass through between the coupling layer 53 and the coupling layer 54. The first layer 51 has a coil connection 51E electrically connected to the second layer 52 of the coil 50.

As shown in FIG. 9, the second layer 52 is wound approximately three times around the coupling layer 59. The second layer 52 includes a portion extending to pass through between the coupling layer 58 and the coupling layer 59. The second layer 52 has a coil connection 52S electrically connected to the coil connection 51E of the first layer 51.

The coil connection 52S penetrates the insulating layer 57 and the insulating film 60 (see FIG. 6) and is electrically connected to the coil connection 51E. In the example shown in FIG. 8 and FIG. 9, the first layer 51 and the second layer 52 are connected in series.

Figure 1:
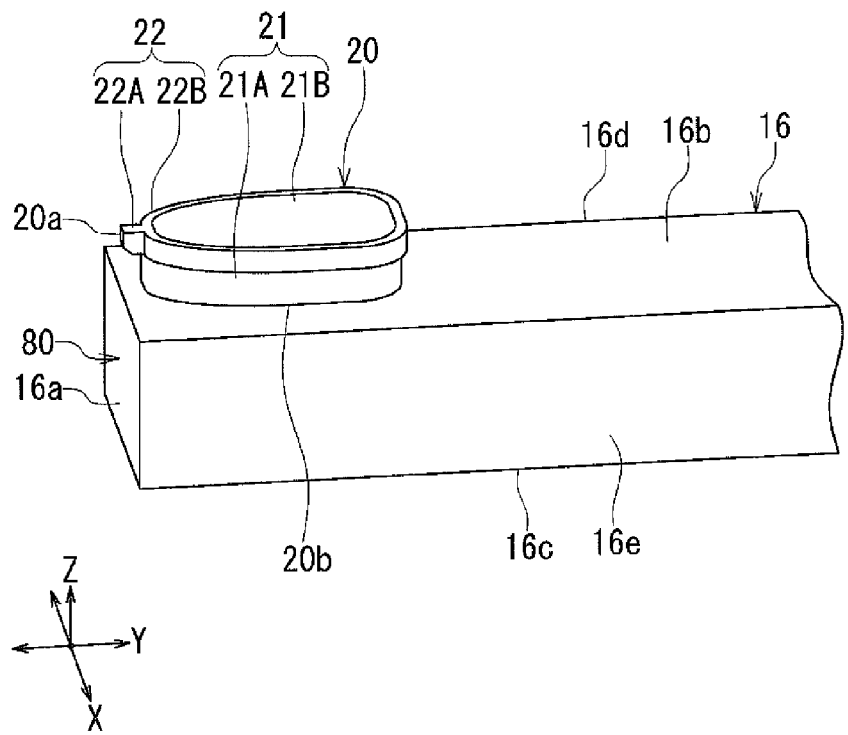
FIG. 1 is a perspective view showing a core and a plasmon generator of a first embodiment of the invention.
Figure 2:
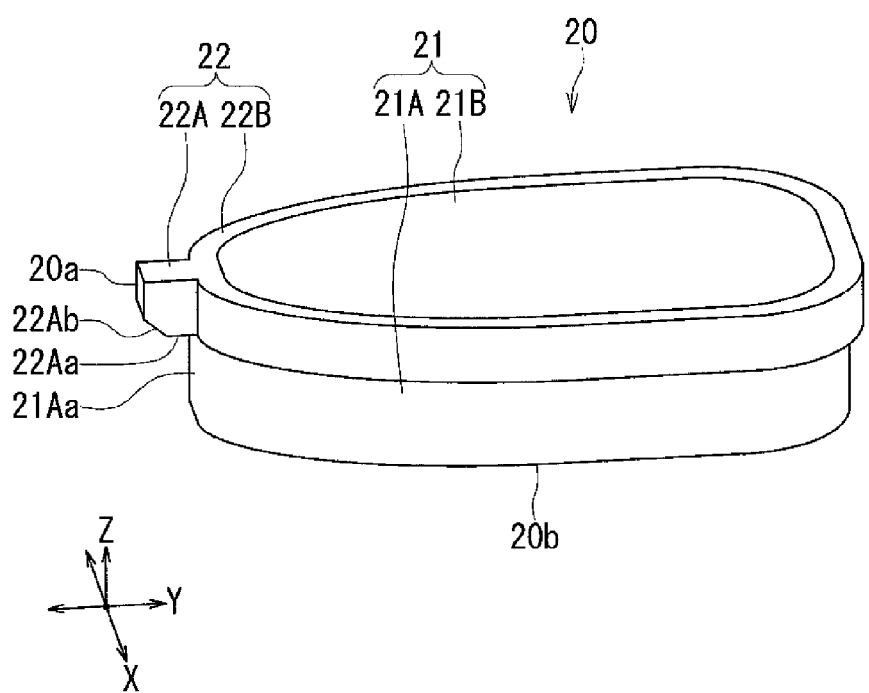
FIG. 2 is a perspective view showing the plasmon generator of the first embodiment of the invention.

The plasmon generator 20 will now be described with reference to FIG. 1 to FIG. 4. FIG. 1 is a perspective view showing the core 16 and the plasmon generator 20. FIG. 2 is a perspective view showing the plasmon generator 20. The plasmon generator 20 has a near-field light generating surface 20a located in the medium facing surface 80. The near-field light generating surface 20a is located between the front end face 40a of the main pole 40 and the front end face 16a of the core 16. The near-field light generating surface 20a generates near-field light on the principle to be described later.

The plasmon generator 20 includes a first material portion 21 formed of a first material, and a second material portion 22 formed of a second material different from the first material. The first material portion 21 is located away from the medium facing surface 80, and has a plasmon exciting section 20b located at a predetermined distance from the evanescent light generating surface 16b and facing the evanescent light generating surface 16b. The cladding layer 18 is interposed between the evanescent light generating surface 16b and the plasmon exciting section 20b. The second material portion 22 includes the near-field light generating surface 20a. The first material may be one of Ag, Au, Al and Cu, for example. The second material may be a metal material having a Vickers hardness higher than that of the first material. The second material may be Ru or Rh, for example.

In the present embodiment, the second material portion 22 includes a ring portion 22B shaped like a ring, and a narrow portion 22A protruding from the ring portion 22B. The ring portion 22B is located away from the medium facing surface 80. The narrow portion 22A includes the near-field light generating surface 20a. The width of the narrow portion 22A in the track width direction (the X direction) may be constant regardless of distance from the medium facing surface 80, or may decrease toward the medium facing surface 80. The narrow portion 22A is smaller than the ring portion 22B in maximum width in the track width direction.

The narrow portion 22A has a bottom surface 22Aa and a connecting surface 22Ab. The connecting surface 22Ab connects the near-field light generating surface 20a and the bottom surface 22Aa. The connecting surface 22Ab is inclined with respect to the medium facing surface 80 such that the distance from the medium facing surface 80 to any point on the connecting surface 22Ab decreases with decreasing distance from the point to the near-field light generating surface 20a.

The width (the dimension in the track width direction (the X direction) of the near-field light generating surface 20a is defined by the width of the narrow portion 22A in the medium facing surface 80. The width of the near-field light generating surface 20a falls within the range of 5 to 40 nm, for example. The height (the dimension in the Z direction) of the near-field light generating surface 20a is defined by the height of the narrow portion 22A in the medium facing surface 80. In the present embodiment, in particular, the height of the narrow portion 22A in the medium facing surface 80 is smaller than the thickness of the ring portion 22B by the height of the connecting surface 22Ab. The height of the near-field light generating surface 20a falls within the range of 5 to 40 nm, for example.

At least part of the first material portion 21 lies inside the ring portion 22B. In the present embodiment, the first material portion 21 includes a first layer portion 21A and a second layer portion 21B. The core 16, the first layer portion 21A and the second layer portion 21B are arranged in this order along the direction of travel of the recording medium 90. The first layer portion 21A includes the plasmon exciting section 20b. The first layer portion 21A is received in the receiving section 18a of the cladding layer 18. The second layer portion 21B lies inside the ring portion 22B. The first layer portion 21A is larger in planar shape (the shape as viewed from above) than the second layer portion 21B.

The first layer portion 21A has a front end portion 21Aa closest to the medium facing surface 80. The front end portion 21Aa of the first layer portion 21A has a bottom end connected to the plasmon exciting section 20b, and a top end in contact with the bottom surface 22Aa of the narrow portion 22A. In the present embodiment, the front end portion 21Aa of the first layer portion 21A is parallel to the medium facing surface 80.

The main pole 40 will now be described in detail with reference to FIG. 3 to FIG. 5. As shown in FIG. 3 and FIG. 4, the front end face 40a of the main pole 40 and the near-field light generating surface 20a of the plasmon generator 20 are at locations different from each other in the direction of travel of the recording medium 90 (the Z direction). In the present embodiment, the front end face 40a is located on the trailing side, i.e., the front side in the direction of travel of the recording medium 90, relative to the near-field light generating surface 20a.

The front end face 40a of the main pole 40 includes a first end face portion 41a, and a second end face portion 42a contiguous with the first end face portion 41a. The second end face portion 42a is located farther from the near-field light generating surface 20a than is the first end face portion 41a, and has a greater width in the track width direction than the first end face portion 41a. In the present embodiment, the second end face portion 42a is located on the front side in the direction of travel of the recording medium 90 relative to the first end face portion 41a. Thus, the near-field light generating surface 20a, the first end face portion 41a and the second end face portion 42a are arranged in this order along the direction of travel of the recording medium 90.

In the present embodiment, as shown in FIG. 3, the first end face portion 41a has a first edge E1 closest to the near-field light generating surface 20a, and a second edge E2 located at the boundary between the first end face portion 41a and the second end face portion 42a. As shown in FIG. 3, the second edge E2 is longer than the first edge E1. The length of the first edge E1 is greater than the width of the near-field light generating surface 20a in the track width direction. Alternatively, the length of the first edge E1 may be smaller than or equal to the width of the near-field light generating surface 20a. The first end face portion 41a includes an upper part and a lower part, the upper part being located between the lower part and the second end face portion 42a of the front end face 40a of the main pole 40. The width of the lower part in the track width direction (the X direction) is substantially constant regardless of distance from the near-field light generating surface 20a. The width of the upper part in the track width direction increases with increasing distance from the near-field light generating surface 20a.

The main pole 40 includes the first portion 41 and the second portion 42 as mentioned previously. As shown in FIG. 3 and FIG. 4, the first portion 41 has the first end face portion 41a. As shown in FIG. 5, the width of the first portion 41 in the track width direction (the X direction) gradually increases with increasing distance from the medium facing surface 80, and then becomes constant.

As shown in FIG. 3 and FIG. 4, the second portion 42 has the second end face portion 42a. In the example shown in FIG. 5, the second portion 42 includes a main portion located away from the medium facing surface 80, and a narrow portion located between the main portion and the medium facing surface 80. The width of the main portion in the track width direction (the X direction) gradually increases with increasing distance from the medium facing surface 80, and then becomes constant. The width of the narrow portion in the track width direction is substantially constant regardless of distance from the medium facing surface 80. The widths of the main portion and the narrow portion are equal at the boundary between the main portion and the narrow portion.

Relative locations of the plasmon generator 20, the gap film 26, the surrounding layer 30 and the main pole 40 with respect to each other in the medium facing surface 80 will now be described with reference to FIG. 3. As shown in FIG. 3, the first side portion 30A of the surrounding layer 30 has a first surrounding layer end face 30Aa located in the medium facing surface 80. The second side portion 30B of the surrounding layer 30 has a second surrounding layer end face 30Ba located in the medium facing surface 80. Since the first and second side portions 30A and 30B are portions of the surrounding layer 30, the surrounding layer 30 can be said to have the first and second surrounding layer end faces 30Aa and 30Ba. The first surrounding layer end face 30Aa and the second surrounding layer end face 30Ba are located on opposite sides of at least part of the first end face portion 41a in the track width direction (the X direction) so that the at least part of the first end face portion 41a is interposed between the first and second surrounding layer end faces 30Aa and 30Ba.

As shown in FIG. 3, the first portion 26A of the gap film 26 has a first gap film end face 26Aa located in the medium facing surface 80. The second portion 26B of the gap film 26 has a second gap film end face 26Ba located in the medium facing surface 80. Since the first and second portions 26A and 26B are portions of the gap film 26, the gap film 26 can be said to have the first and second gap film end faces 26Aa and 26Ba. The first gap film end face 26Aa and the second gap film end face 26Ba are located on opposite sides of at least part of the near-field light generating surface 20a in the track width direction (the X direction) so that the at least part of the near-field light generating surface 20a is interposed between the first and second gap film end faces 26Aa and 26Ba.

The first gap film end face 26Aa has a top edge E3 located at its front-side end in the direction of travel of the recording medium 90 (the Z direction). The second gap film end face 26Ba has a top edge E4 located at its front-side end in the direction of travel of the recording medium 90. The top edges E3 and E4 are interposed between the first and second surrounding layer end faces 30Aa and 30Ba and are located on the rear side in the direction of travel of the recording medium 90 relative to the first edge E1 of the first end face portion 41a. Thus, each of the first and second gap film end faces 26Aa and 26Ba includes a portion located between the first and second surrounding layer end faces 30Aa and 30Ba, but does not include any portion interposed between the first surrounding layer end face 30Aa and the first end face portion 41a or between the second surrounding layer end face 30Ba and the first end face portion 41a.

Now, the relationship of the first surrounding layer end face 30Aa with the first side shield 32A and the first nonmagnetic film 31A will be described. The first side shield 32A has a first side shield end face 32Aa constituting at least part of the first surrounding layer end face 30Aa. The first nonmagnetic film 31A has a first nonmagnetic film end face 31Aa located in the medium facing surface 80. The first surrounding layer end face 30Aa is constituted by the first side shield end face 32Aa and the first nonmagnetic film end face 31Aa.

Next, the relationship of the second surrounding layer end face 30Ba with the second side shield 32B and the second nonmagnetic film 31B will be described. The second side shield 32B has a second side shield end face 32Ba constituting at least part of the second surrounding layer end face 30Ba. The second nonmagnetic film 31B has a second nonmagnetic film end face 31Ba located in the medium facing surface 80. The second surrounding layer end face 30Ba is constituted by the second side shield end face 32Ba and the second nonmagnetic film end face 31Ba.

If the distance between the first end face portion 41a of the first portion 41 of the main pole 40 and the first side shield end face 32Aa and the distance between the first end face portion 41a and the second side shield end face 32Ba are excessively small, there arises the problem that the write magnetic field produced from the first end face portion 41a is small in magnitude. According to the present embodiment, it is possible to adjust the aforementioned distances by the width of the portion of each of the first and second gap film end faces 26Aa and 26Ba located between the first surrounding layer end face 30Aa and the second surrounding layer end face 30Ba. The present embodiment allows for the prevention of the aforementioned problem by appropriate sizing of the aforementioned distances.

Now, the principle of generation of near-field light in the present embodiment and the principle of thermally-assisted magnetic recording using near-field light will be described in detail. Laser light emitted from a laser diode (not illustrated) enters the core 16. As shown in FIG. 6, the laser light 70 propagates through the core 16 toward the medium facing surface 80, and reaches the vicinity of the plasmon generator 20. The evanescent light generating surface 16b of the core 16 generates evanescent light based on the laser light 70 propagating through the core 16. More specifically, the laser light 70 is totally reflected at the evanescent light generating surface 16b, and the evanescent light generating surface 16b thereby generates evanescent light that permeates into the cladding layer 18. In the plasmon generator 20, surface plasmons are excited on the plasmon exciting section 20b through coupling with the aforementioned evanescent light. The surface plasmons propagate to the near-field light generating surface 20a, and the near-field light generating surface 20a generates near-field light based on the surface plasmons.

The near-field light generated from the near-field light generating surface 20a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 40 for data writing.

The specific functions and effects of the thermally-assisted magnetic recording head according to the present embodiment will now be described. In the present embodiment, the plasmon generator 20 includes the first material portion 21 and the second material portion 22 which are formed of different materials. The first material portion 21 is located away from the medium facing surface 80. The second material portion 22 includes the near-field light generating surface 20a. The present embodiment is configured so that surface plasmons are excited on the first material portion 21. To excite a lot of surface plasmons on the first material portion 21 and propagate the surface plasmons efficiently, it is thus preferred that the first material be a high electrical conductivity material, and more specifically, one of Ag, Au, Al and Cu.

The second material portion 22 is exposed in the medium facing surface 80. Thus, the second material is preferably a metal material having a Vickers hardness higher than that of the first material. This makes it possible for the plasmon generator 20 to provide higher reliability when compared with the case where the entire plasmon generator 20 is formed of the first material.

The thermally-assisted magnetic recording head according to the present embodiment has the following features A and B.

[Feature A]

The front end face 40a of the main pole 40 includes the first end face portion 41a and the second end face portion 42a, the second end face portion 42a being greater than the first end face portion 41a in width in the track width direction.

[Feature B]

The surrounding layer 30 has the first and second surrounding layer end faces 30Aa and 30Ba located in the medium facing surface 80. The first surrounding layer end face 30Aa and the second surrounding layer end face 30Ba are located on opposite sides of at least part of the first end face portion 41a in the track width direction so that the at least part of the first end face portion 41a is interposed between the first and second surrounding layer end faces 30Aa and 30Ba. The gap film 26 has the first and second gap film end faces 26Aa and 26Ba located in the medium facing surface 80. The first gap film end face 26Aa and the second gap film end face 26Ba are located on opposite sides of at least part of the near-field light generating surface 20a in the track width direction so that the at least part of the near-field light generating surface 20a is interposed between the first and second gap film end faces 26Aa and 26Ba. Each of the first and second gap film end faces 26Aa and 26Ba includes a portion located between the first and second surrounding layer end faces 30Aa and 30Ba, but does not include any portion interposed between the first surrounding layer end face 30Aa and the first end face portion 41a or between the second surrounding layer end face 30Ba and the first end face portion 41a.

According to the present embodiment, the feature A makes it possible for the main pole 40 to pass a larger amount of magnetic flux when compared with the case where the front end face 40a of the main pole 40 is constituted only of the first end face portion 41a. This allows the main pole 40 to be capable of producing a write magnetic field of sufficient magnitude.

According to the present embodiment, the feature B makes it possible that the space between the first and second surrounding layer end faces 30Aa and 30Ba in which at least part of the first end face portion 41a lies can be adjusted by the width of the portion of each of the first and second gap film end faces 26Aa and 26Ba located between the first surrounding layer end face 30Aa and the second surrounding layer end face 30Ba. Further, since the space between the first and second surrounding layer end faces 30Aa and 30Ba is adjustable as mentioned above, it is possible to adjust the space between the first end face portion 41a and the first surrounding layer end face 30Aa and the space between the first end face portion 41a and the second surrounding layer end face 30Ba. The present embodiment thus allows for a desired sizing of the width of the first end face portion 41a without limitations imposed by the width of the near-field light generating surface 20a, while allowing for precise alignment of the near-field light generating surface 20a and the first end face portion 41a with each other.

In the present embodiment, a portion of the separating film 28 is interposed between the main pole 40 and the surrounding layer 30. Thus, according to the present embodiment, the space between the first end face portion 41a and the first surrounding layer end face 30Aa and the space between the first end face portion 41a and the second surrounding layer end face 30Ba are adjustable also by the thickness of the separating film 28.

A manufacturing method for the thermally-assisted magnetic recording head according to the present embodiment will now be described. The manufacturing method for the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality of pre-head portions arranged in rows, the plurality of pre-head portions becoming individual thermally-assisted magnetic recording heads later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads are produced in this manner.

The manufacturing method for the thermally-assisted magnetic recording head according to the present embodiment will be described in more detail below with attention focused on a single thermally-assisted magnetic recording head. The manufacturing method for the thermally-assisted magnetic recording head starts with forming the insulating layer 2, the bottom shield layer 3, and the bottom shield gap film 4 in this order on the substrate 1. Then, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, a non-illustrated insulating layer is formed to cover the return pole layer 11. The non-illustrated insulating layer is then polished by, for example, chemical mechanical polishing (hereinafter referred to as CMP), until the return pole layer 11 is exposed. Next, the coupling layer 12 and the first layers of the coupling sections 13A and 13B are formed on the return pole layer 11. Then, the insulating layer 14 is formed over the entire top surface of the stack. The insulating layer 14 is then polished by, for example, CMP, until the coupling layer 12 and the first layers of the coupling sections 13A and 13B are exposed.

Next, the cladding layer 15 is formed over the entire top surface of the stack. The cladding layer 15 is then selectively etched to form therein two first openings for exposing the top surface of the coupling layer 12 and two second openings for exposing the top surfaces of the first layers of the coupling sections 13A and 13B. Then, the coupling layers 19A and 19B are formed on the coupling layer 12 at the locations of the first openings, and the second layers of the coupling sections 13A and 13B are formed on the first layers thereof at the locations of the second openings. The core 16 is then formed on the cladding layer 15. The cladding layer 17 is then formed over the entire top surface of the stack. The cladding layer 17 is then polished by, for example, CMP, until the core 16, the second layers of the coupling sections 13A and 13B, and the coupling layers 19A and 19B are exposed. Next, the cladding layer 18 is formed over the entire top surface of the stack.

Reference is now made to FIG. 10A to FIG. 23B to describe steps to be performed after the formation of the cladding layer 18 up to the formation of the second heat sink 29. FIG. 10A to FIG. 23B each show a stack of layers formed in the process of manufacturing the thermally-assisted magnetic recording head. Fig. mA (m is an integer between 10 and 23 inclusive) shows a cross section of the stack taken at the location at which the medium facing surface 80 is to be formed. Fig. mB shows a cross section that intersects the front end face 40a of the main pole 40 and that is perpendicular to the medium facing surface 80 and to the top surface 1a of the substrate 1. Fig. mA and Fig. mB omit the illustration of portions located below the core 16. In Fig. mB, the symbol "ABS" indicates the location at which the medium facing surface 80 is to be formed. Fig. nC (n is an integer between 10 and 15 inclusive) is a perspective view showing a part of the stack.

Figure 10A:
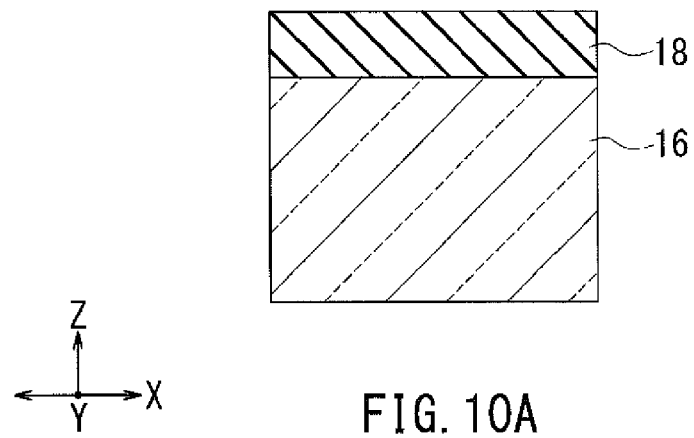
FIG. 10A to FIG. 10C are explanatory diagrams showing a step of a manufacturing method for the thermally-assisted magnetic recording head according to the first embodiment of the invention.
Figure 10B:
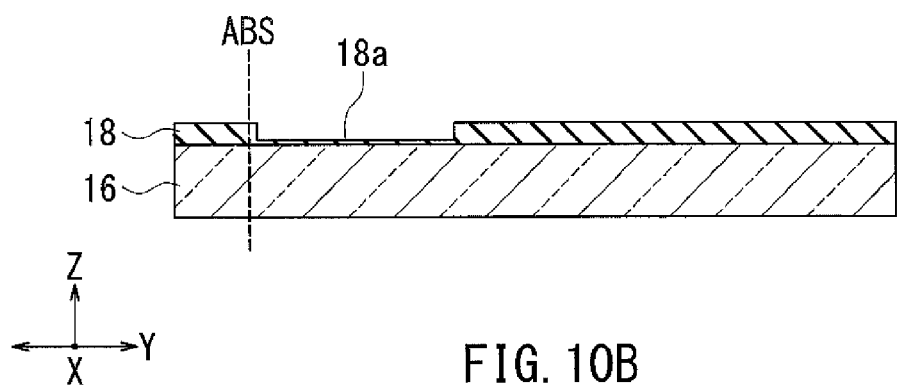
Figure 10C:
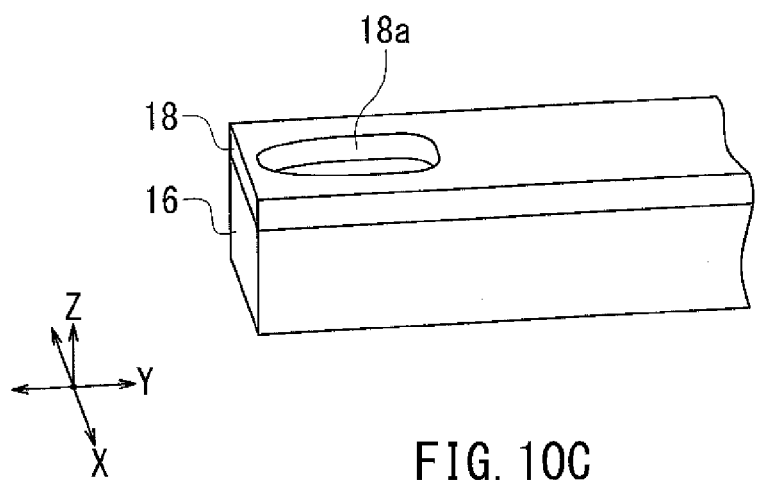

FIG. 10A to FIG. 10C show a step that follows the formation of the cladding layer 18. In this step, the cladding layer 18 is selectively etched by, for example, reactive ion etching (hereinafter referred to as RIE), to thereby form the receiving section 18a in the cladding layer 18. The receiving section 18a is formed such that its bottom does not reach the evanescent light generating surface 16b of the core 16.

Figure 11A:
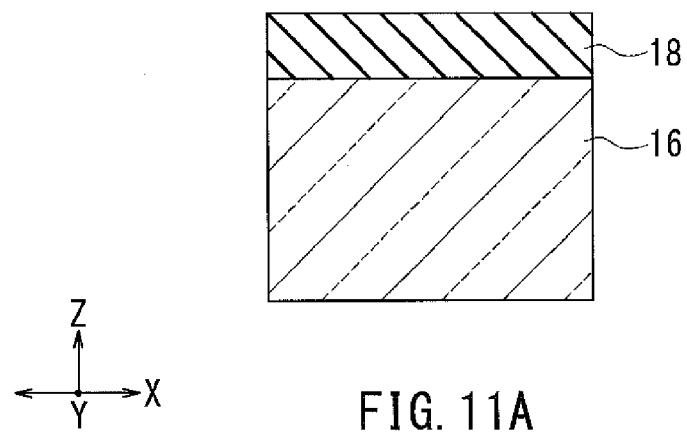
FIG. 11A to FIG. 11C are explanatory diagrams showing a step that follows the step shown in FIG. 10A to FIG. 10C.
Figure 11B:
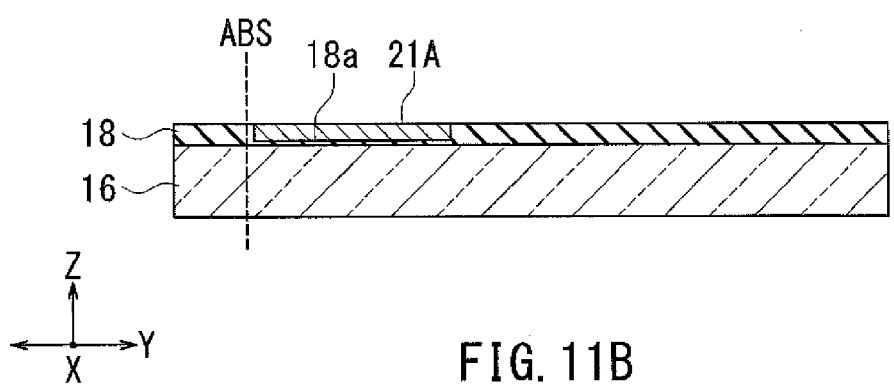
Figure 11C:
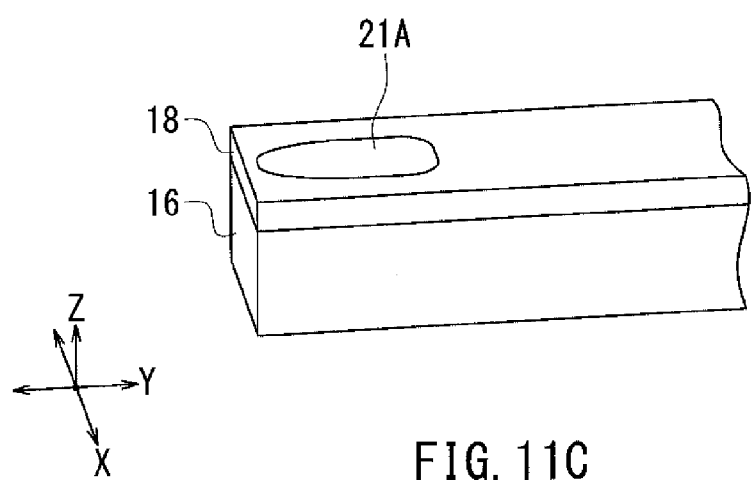

FIG. 11A to FIG. 11C show the next step. In this step, first formed is an initial first layer portion which will later become the first layer portion 21A of the first material portion 21. The initial first layer portion is formed to fill the receiving section 18a of the cladding layer 18 and to have a top surface higher in level than the top surface of the cladding layer 18. Then, the initial first layer portion is polished by, for example, CMP, so that its top surface becomes even with the top surface of the cladding layer 18. This makes the initial first layer portion into the first layer portion 21A.

Figure 12A:
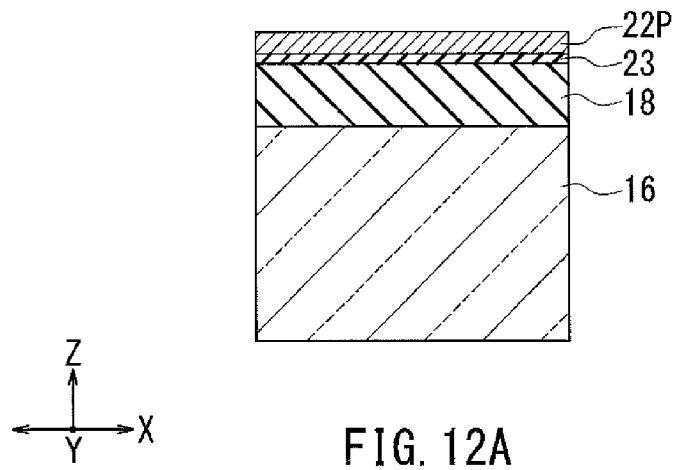
FIG. 12A to FIG. 12C are explanatory diagrams showing a step that follows the step shown in FIG. 11A to FIG. 11C.
Figure 12B:
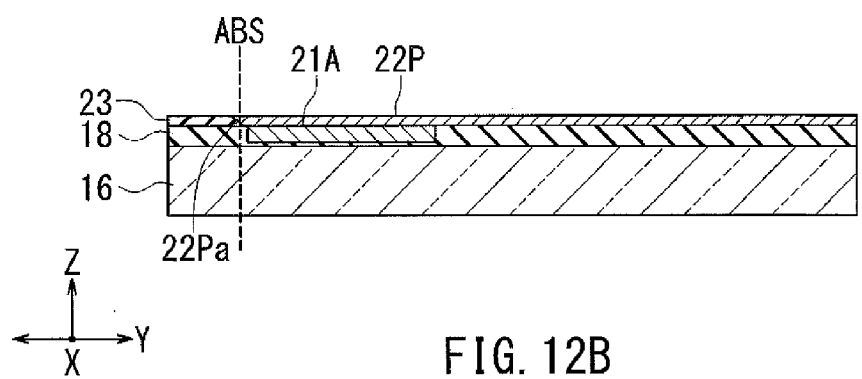
Figure 12C:
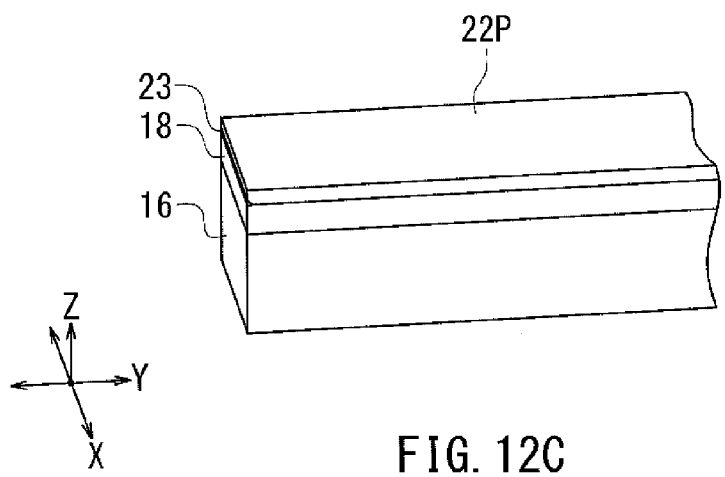

FIG. 12A to FIG. 12C show the next step. In this step, first, the dielectric layer 23 is formed on the top surface of the stack. Part of the dielectric layer 23 is then etched by, for example, ion beam etching (hereinafter referred to as IBE), to thereby provide the dielectric layer 23 with an inclined surface. The inclined surface is formed to intersect the location ABS at which the medium facing surface 80 is to be formed. Then, an initial second material portion 22P, which will later become the second material portion 22 of the plasmon generator 20, is formed to cover the cladding layer 18, the first layer portion 21A and the dielectric layer 23. The initial second material portion 22P is then polished by, for example, CMP, until the dielectric layer 23 is exposed. The initial second material portion 22P has an initial connecting surface 22Pa including the connecting surface 22Ab. The initial connecting surface 22Pa is in contact with the aforementioned inclined surface of the dielectric layer 23.

Figure 13A:
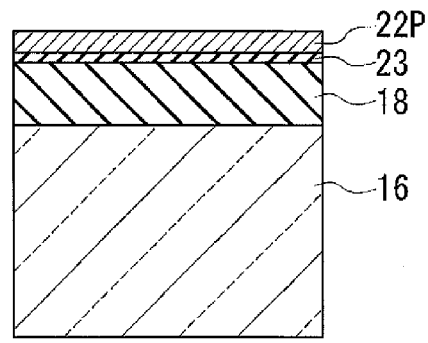
FIG. 13A to FIG. 13C are explanatory diagrams showing a step that follows the step shown in FIG. 12A to FIG. 12C.
Figure 13B:
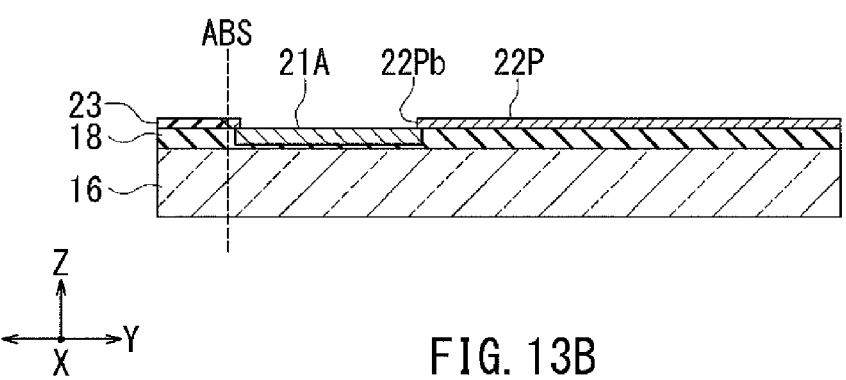
Figure 13C:
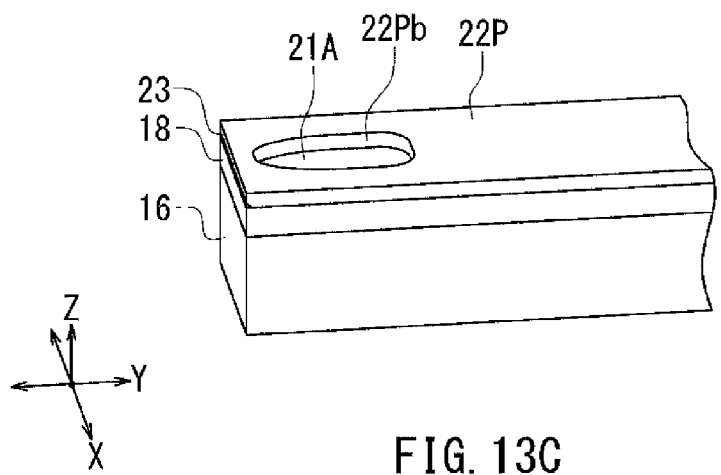

FIG. 13A to FIG. 13C show the next step. In this step, an opening 22Pb for exposing the top surface of the first layer portion 21A is formed in the initial second material portion 22P by RIE or IBE, for example. The opening 22Pb will later become the inner part of the ring portion 22B of the second material portion 22.

Figure 14A:
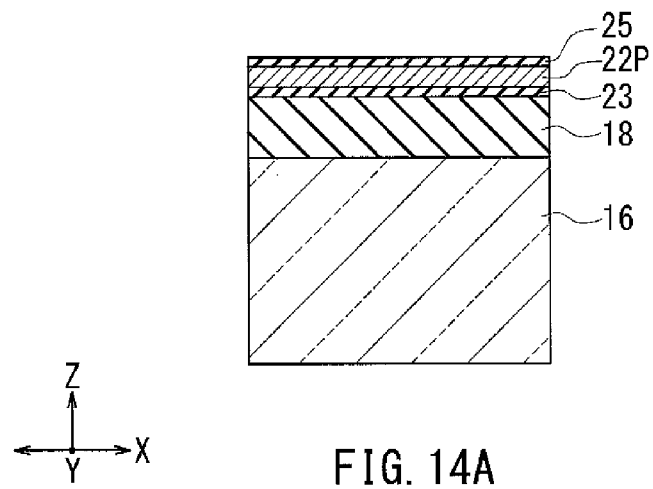
FIG. 14A to FIG. 14C are explanatory diagrams showing a step that follows the step shown in FIG. 13A to FIG. 13C.
Figure 14B:
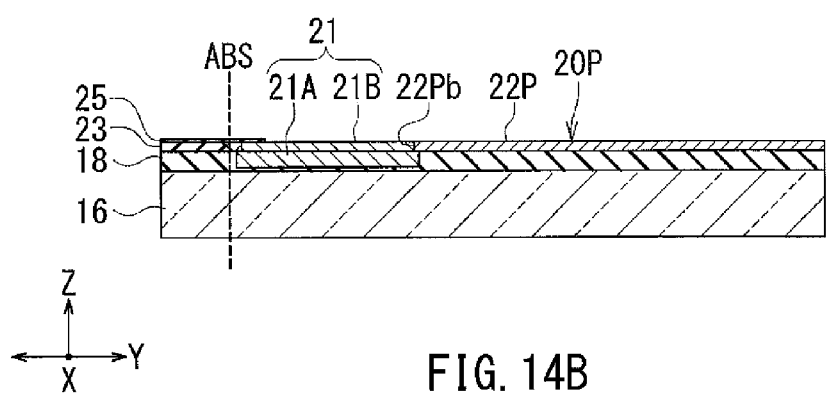
Figure 14C:
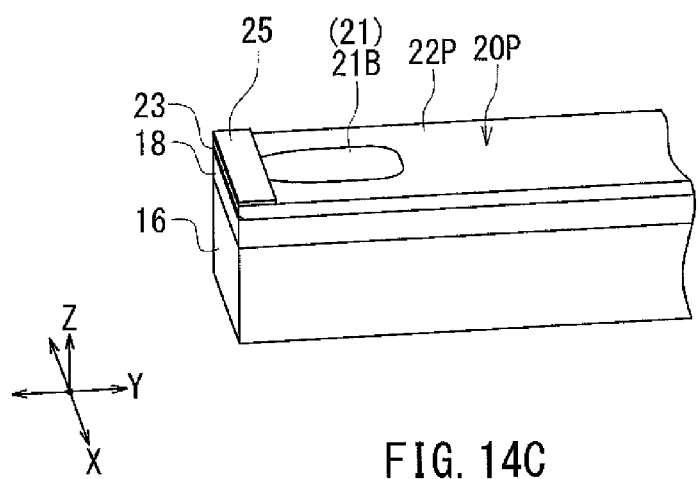

FIG. 14A to FIG. 14C show the next step. In this step, first formed is an initial second layer portion which will later become the second portion 21B of the first material portion 21 of the plasmon generator 20. The initial second layer portion is formed to fill the opening 22Pb of the initial second material portion 22P and to have a top surface higher in level than the top surface of the initial second material portion 22P. The initial second layer portion is then polished by, for example, CMP, so that its top surface becomes even with the top surface of the initial second material portion 22P. This makes the initial second layer portion into the second layer portion 21B, thereby completing the first material portion 21. A series of steps from the step of forming the initial first layer portion to the step of polishing the initial second layer portion corresponds to the step of forming the initial plasmon generator of the present invention. In FIG. 14A to FIG. 14C the initial plasmon generator is denoted by symbol 20P. The initial plasmon generator 20P includes the first material portion 21 and the initial second material portion 22P.

In the step shown in FIG. 14A to FIG. 14C, the insulating film 25 is then selectively formed on a part of the top surface of the initial plasmon generator 20P that lies at the location ABS at which the medium facing surface 80 is to be formed and its vicinity. The insulating film 25 may be formed by a lift-off process. Alternatively, an initial insulating film may be first formed over the entire top surface of the initial plasmon generator 20P and then the initial insulating film may be patterned into the insulating film 25 by IBE, for example.

Figure 15A:
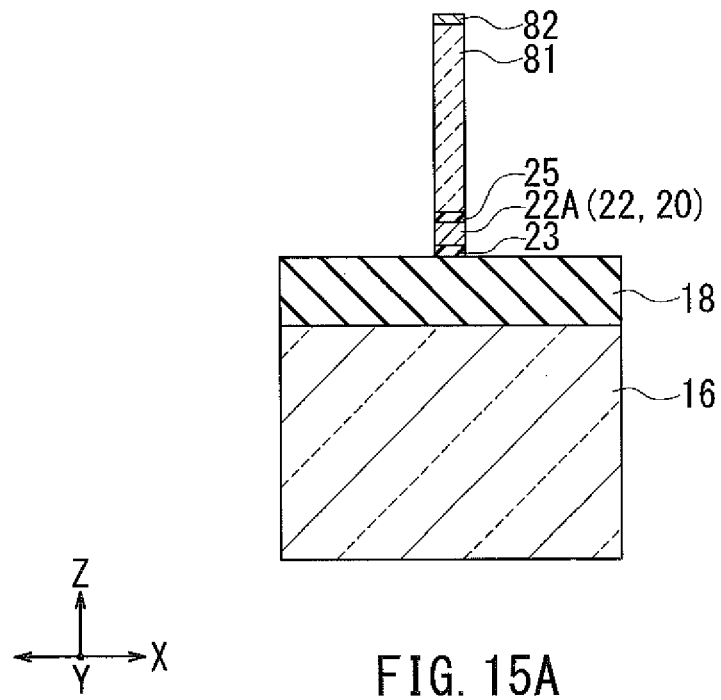
FIG. 15A to FIG. 15C are explanatory diagrams showing a step that follows the step shown in FIG. 14A to FIG. 14C.
Figure 15B:
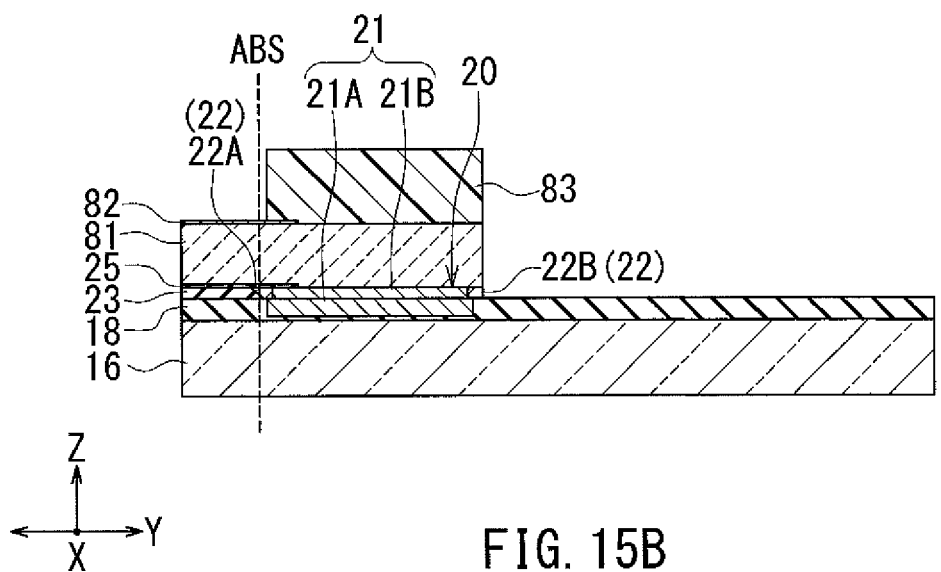
Figure 15C:
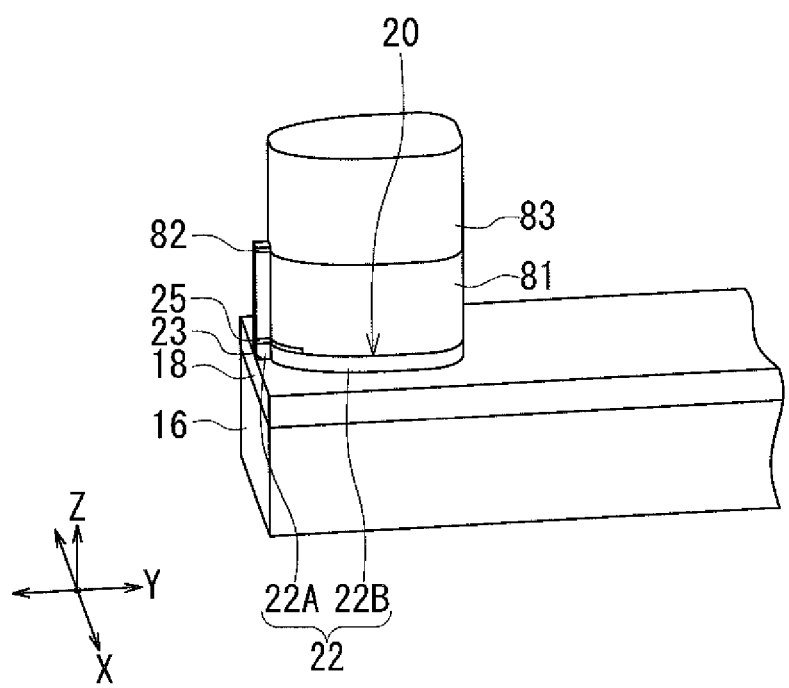

FIG. 15A to FIG. 15C show the next step. In this step, first, a mask material layer is formed on the initial plasmon generator 20P and the insulating film 25. The mask material layer is formed of carbon, for example. Then, a partial mask layer 82 is formed on a part of the top surface of the mask material layer that lies at the location ABS at which the medium facing surface 80 is to be formed and its vicinity. The partial mask layer 82 has a wall face that defines the location of the edge of the narrow portion 22A of the second material portion 22 in the track width direction (the X direction). The partial mask layer 82 is formed of a metal such as Ta or Ru. Then, a photoresist mask 83 is formed on portions of the mask material layer and the partial mask layer 82 apart from the location ABS at which the medium facing surface 80 is to be formed. The photoresist mask 83 is formed by patterning a photoresist layer by photolithography. Other photoresist masks to be used in later steps will be formed in the same manner as the photoresist mask 83. The photoresist mask 83 has a wall face that defines the location of the edge of the ring portion 22B of the second material portion 22.

Next, the mask material layer is etched by, for example, IBE, using the partial mask layer 82 and the photoresist mask 83 as an etching mask. This makes the mask material layer into an etching mask 81 for use to pattern the initial plasmon generator 20P. Subsequently, the initial plasmon generator 20P, the dielectric layer 23 and the insulating film 25 are etched by, for example, IBE, using the etching mask 81. Specifically, the etching of the initial plasmon generator 20P is to etch the initial second material portion 22P of the initial plasmon generator 20P so that the initial second material portion 22P becomes the second material portion 22. As a result of the etching, the initial plasmon generator 20P becomes the plasmon generator 20. The photoresist mask 83 is then removed.

Figure 16A:
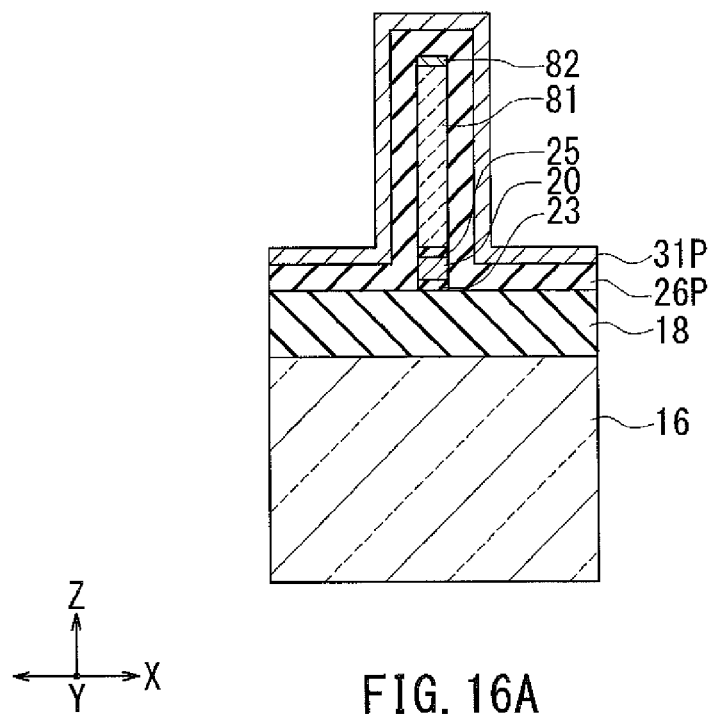
FIG. 16A and FIG. 16B are cross-sectional views showing a step that follows the step shown in FIG. 15A to FIG. 15C.
Figure 16B:
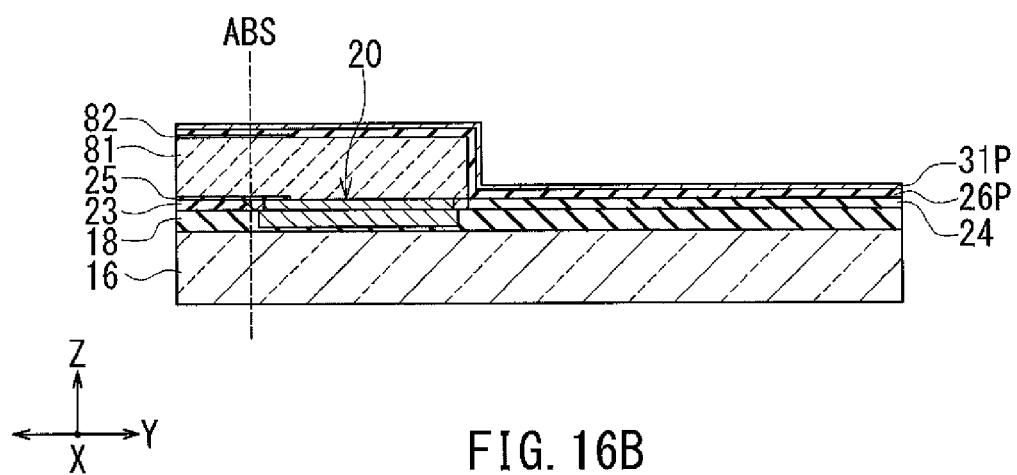

FIG. 16A and FIG. 16B show the next step. In this step, first, the dielectric layer 24 is formed on the cladding layer 18 at a location apart from the location ABS at which the medium facing surface 80 is to be formed. Then, an initial gap film 26P is formed over the entire top surface of the stack by atomic layer deposition, for example. The initial gap film 26P is formed to cover the plasmon generator 20 and the etching mask 81. Next, a nonmagnetic film 31P, which will later become the first to third nonmagnetic films 31A, 31B and 31C of the surrounding layer 30, is formed over the entire top surface of the stack.

Figure 17A:
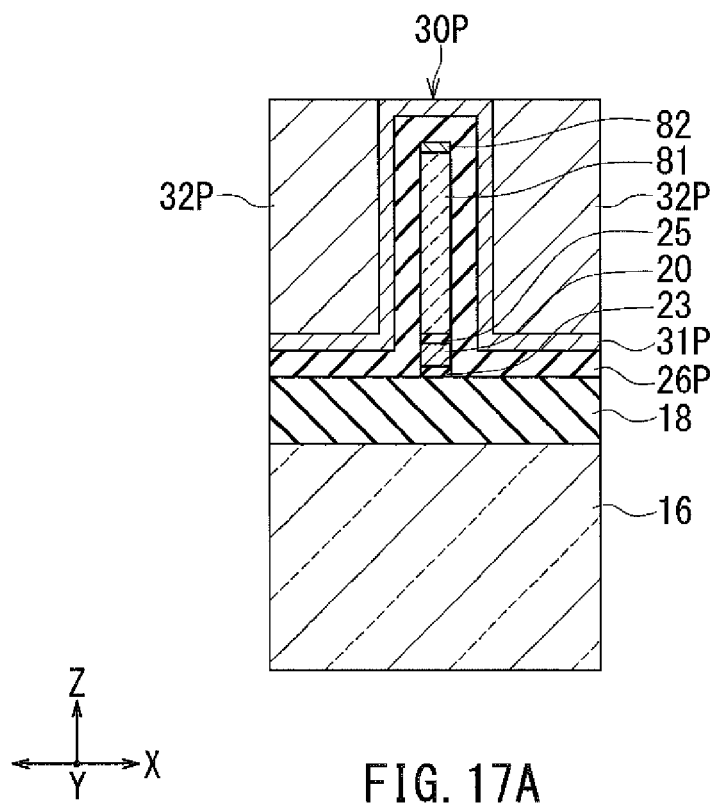
FIG. 17A and FIG. 17B are cross-sectional views showing a step that follows the step shown in FIG. 16A and FIG. 16B.
Figure 17B:
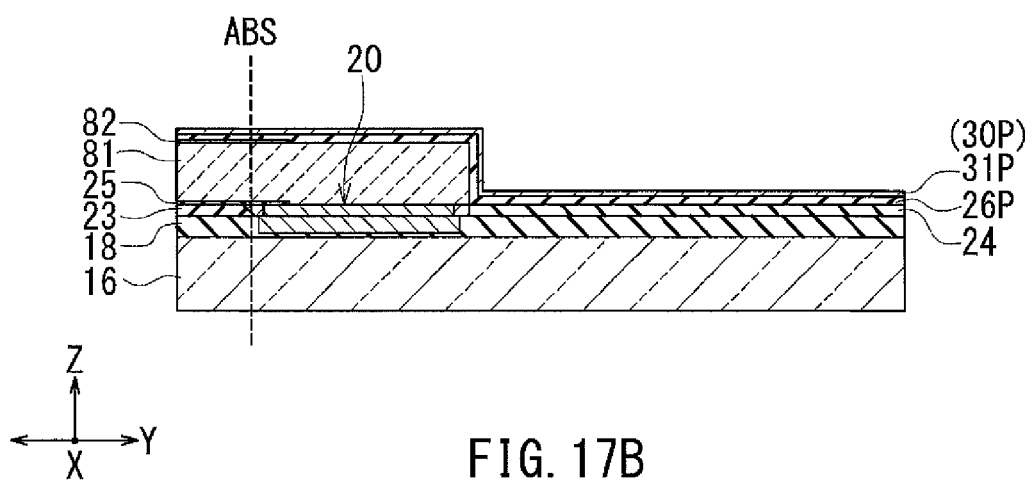

FIG. 17A and FIG. 17B show the next step. In this step, a magnetic film 32P, which will later become the first and second side shields 32A and 32B of the surrounding layer 30, is formed on the nonmagnetic film 31P. The nonmagnetic film 31P and the magnetic film 32P constitute an initial surrounding layer 30P. As shown in FIG. 17A and FIG. 17B, the initial surrounding layer 30P is formed to cover the initial gap film 26P.

Figure 18A:
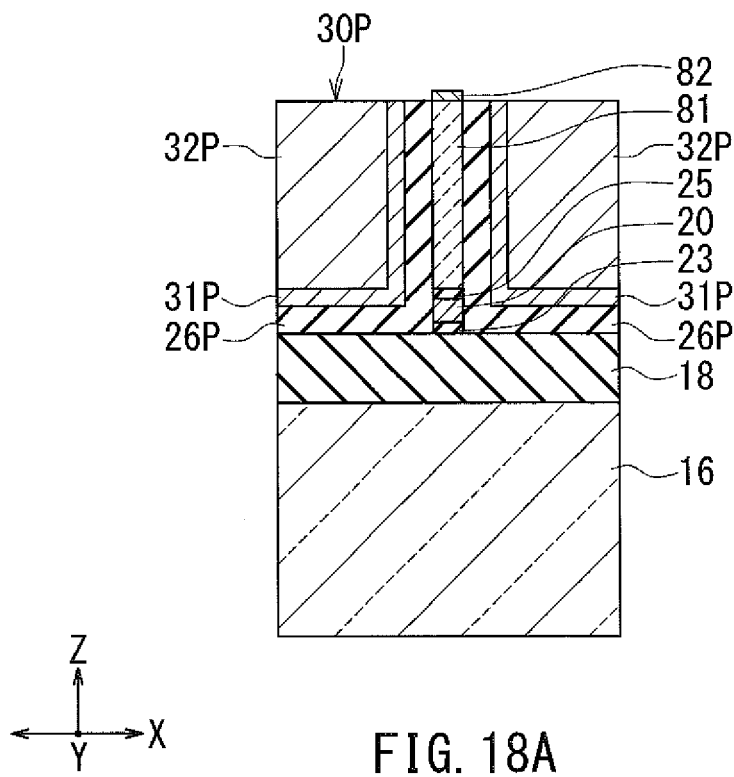
FIG. 18A and FIG. 18B are cross-sectional views showing a step that follows the step shown in FIG. 17A and FIG. 17B.
Figure 18B:
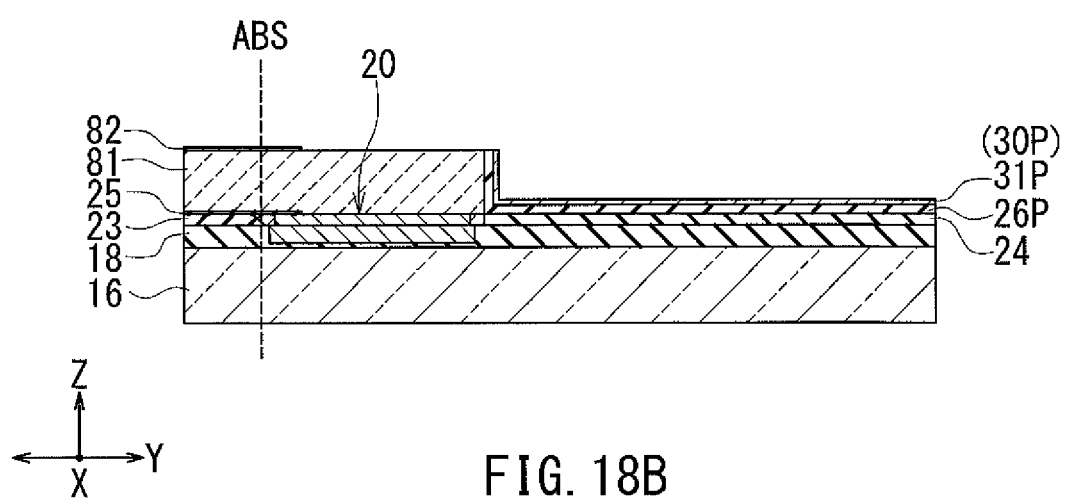

FIG. 18A and FIG. 18B show the next step. In this step, the initial gap film 26P and the initial surrounding layer 30P are polished by, for example, CMP, until the etching mask 81 and the partial mask layer 82 are exposed.

Figure 19A:
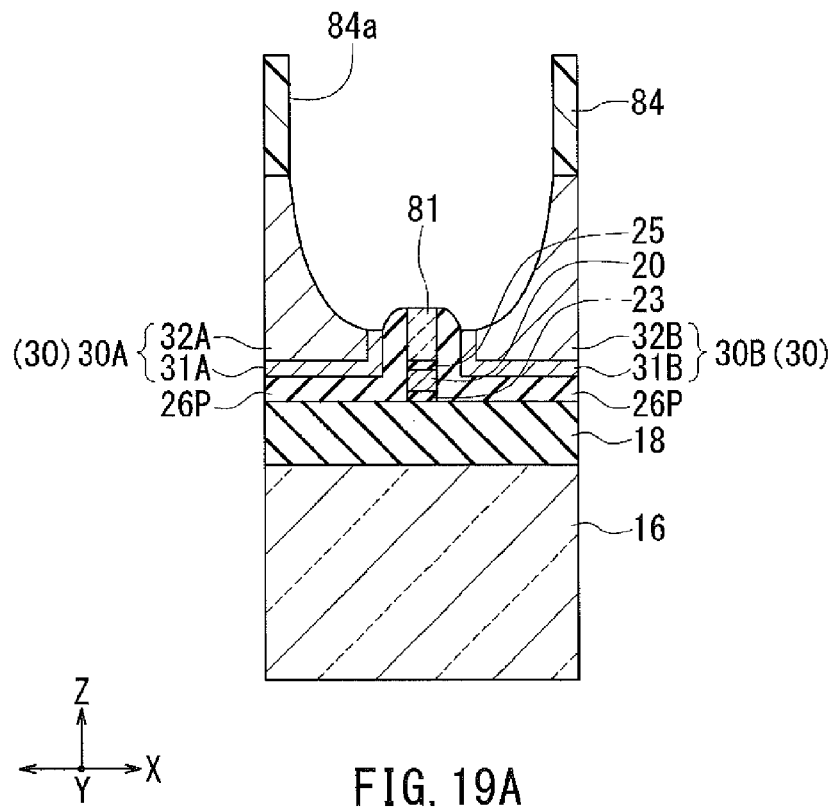
FIG. 19A and FIG. 19B are cross-sectional views showing a step that follows the step shown in FIG. 18A and FIG. 18B.
Figure 19B:
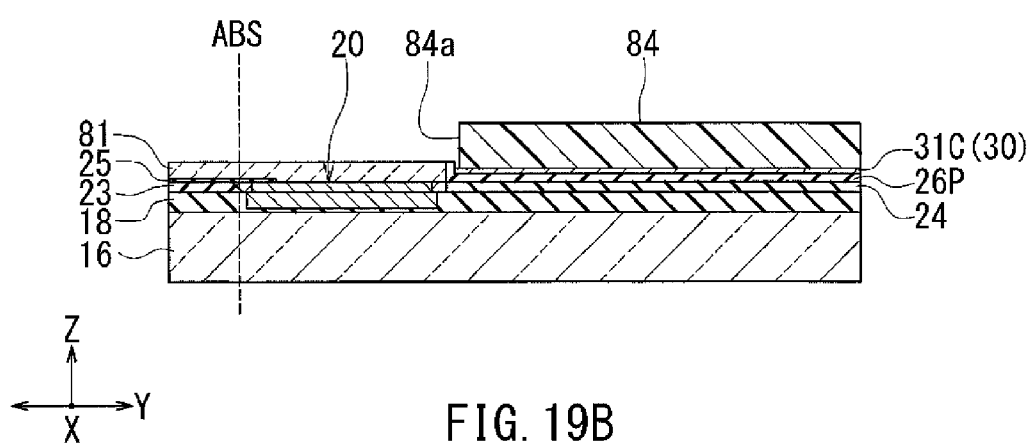

FIG. 19A to FIG. 19B show the next step. In this step, first, a photoresist mask 84 is formed on the initial surrounding layer 30P. The photoresist mask 84 has an opening 84a shaped to correspond to the planar shape of the plasmon generator 20. The opening 84a is larger in planar shape than the plasmon generator 20. Next, the entirety of the partial mask layer 82, a portion of each of the initial gap film 26P and the initial surrounding layer 30P, and at least a portion of the etching mask 81 are etched by, for example, IBE, using the photoresist mask 84 as an etching mask. This makes the nonmagnetic film 31P into the first to third nonmagnetic films 31A, 31B and 31C, and makes the magnetic layer 32P into the first and second side shields 32A and 32B. As a result, the initial surrounding layer 30P becomes the surrounding layer 30. In the present embodiment, the etching mask 81 is partially etched so that the entirety of the partial mask layer 82 is removed and a portion of the etching mask 81 remains on the plasmon generator 20 and the insulating film 25. This makes it possible to prevent the top surface of the plasmon generator 20 from being damaged by etching.

Figure 20A:
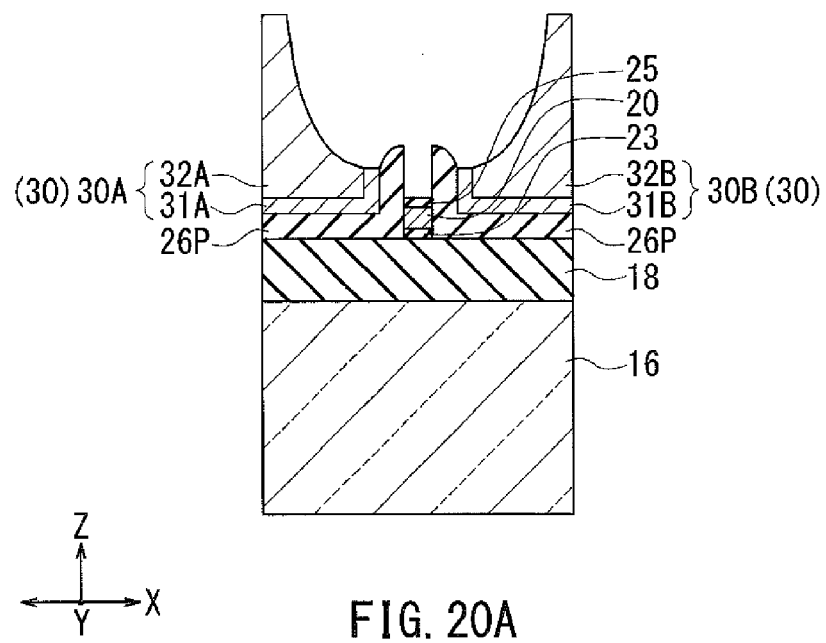
FIG. 20A and FIG. 20B are cross-sectional views showing a step that follows the step shown in FIG. 19A and FIG. 19B.
Figure 20B:
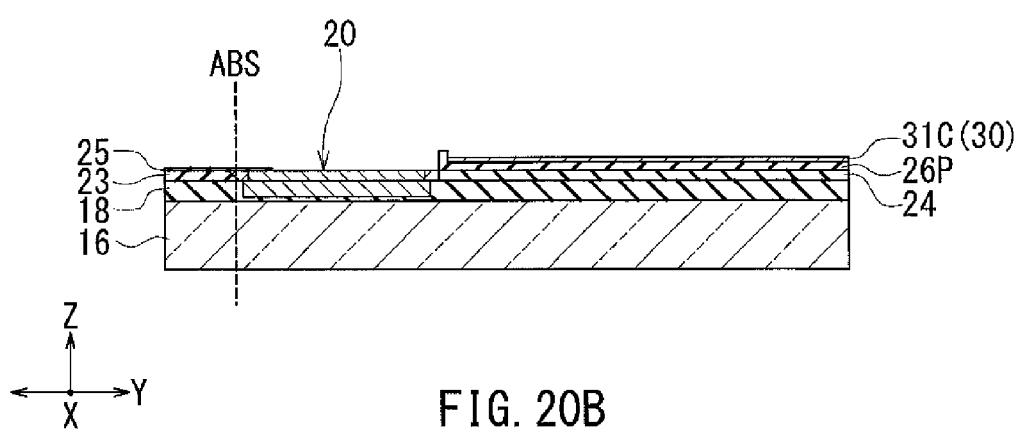

FIG. 20A and FIG. 20B show the next step. In this step, the remainder of the etching mask 81 remaining after the step of FIG. 19A and FIG. 19B, and the photoresist mask 84 are removed. Where the etching mask 81 is formed of carbon or a photoresist, removal of the etching mask 81 is effected by ashing, for example.

Figure 21A:
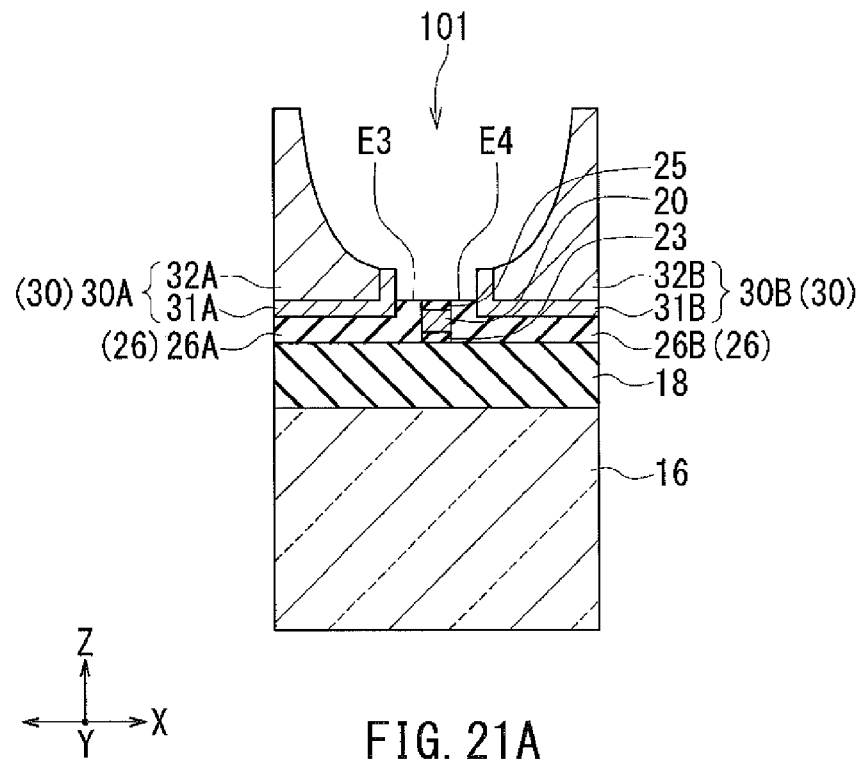
FIG. 21A and FIG. 21B are cross-sectional views showing a step that follows the step shown in FIG. 20A and FIG. 20B.
Figure 21B:
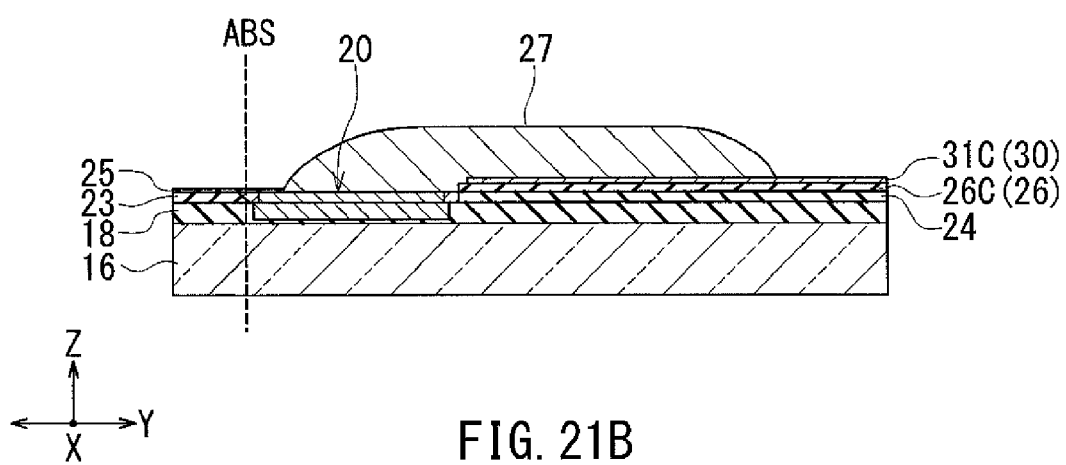

FIG. 21A and FIG. 21B show the next step. In this step, first, a portion of the initial gap film 26P is removed by etching so that the initial gap film 26P is provided with the top edges E3 and E4. The etching of the initial gap film 26P is effected by, for example, wet etching using an alkaline developing solution. This etching makes the initial gap film 26P into the gap film 26 and results in the formation of a structure having a recess 101, the structure including the plasmon generator 20, the surrounding layer 30 and the gap film 26. The step of removing a portion of the initial gap film 26P and the step of removing the etching mask 81 shown in FIG. 20A and FIG. 20B may be performed in the reverse order to that described above. Then, the first heat sink 27 is formed on the plasmon generator 20 and the third nonmagnetic film 31C.

Figure 22A:
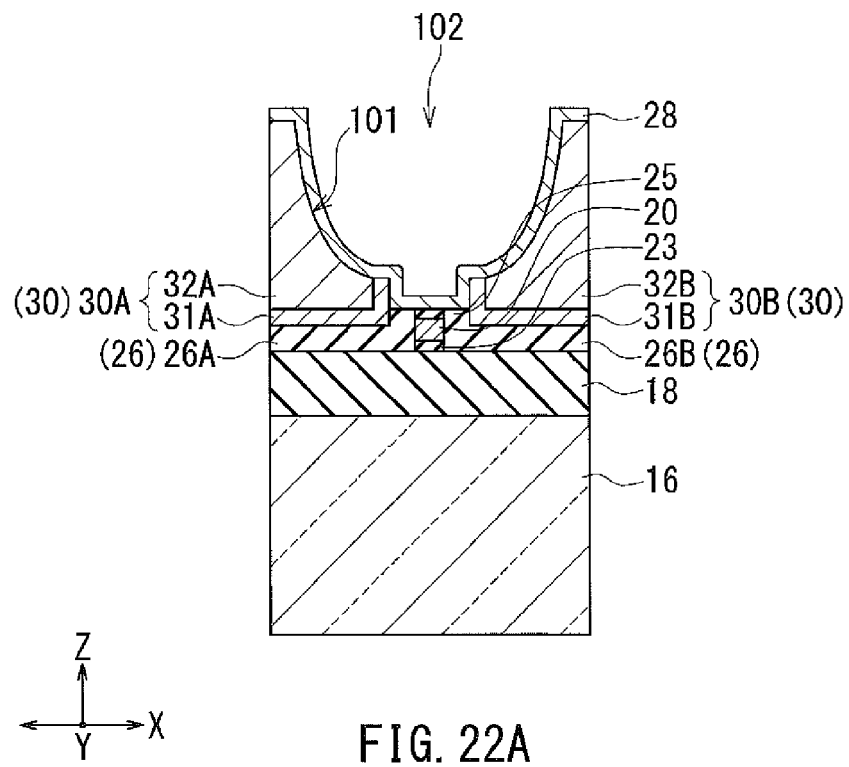
FIG. 22A and FIG. 22B are cross-sectional views showing a step that follows the step shown in FIG. 21A and FIG. 21B.
Figure 22B:
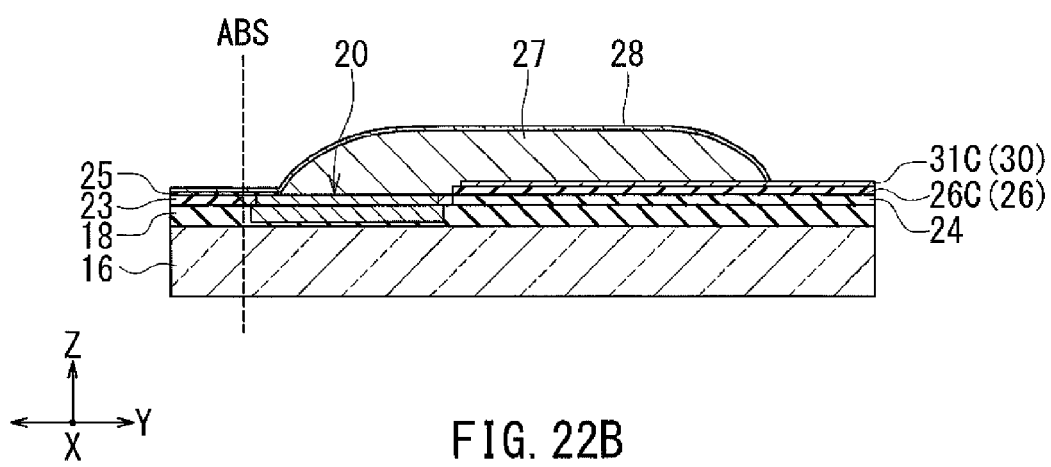

FIG. 22A and FIG. 22B show the next step. In this step, the separating film 28 is formed on the aforementioned structure and the first heat sink 27 by atomic layer deposition, for example. The separating film 28 forms a receiving section 102 shaped to correspond to the recess 101.

Figure 23A:
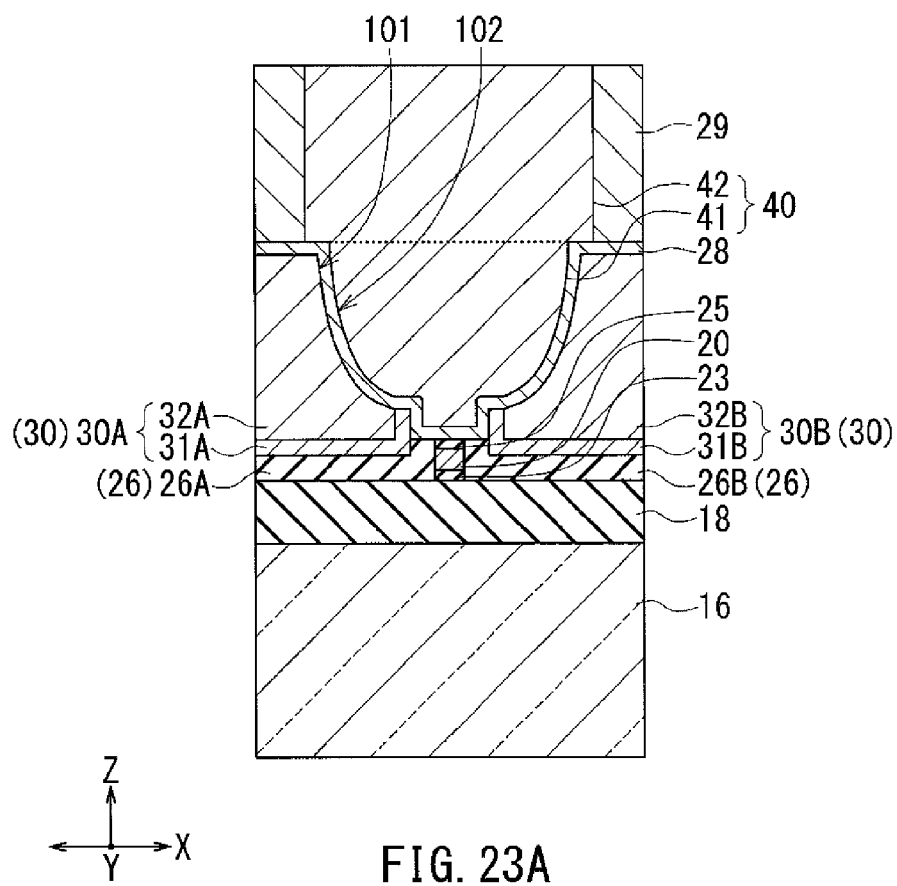
FIG. 23A and FIG. 23B are cross-sectional views showing a step that follows the step shown in FIG. 22A and FIG. 22B.
Figure 23B:
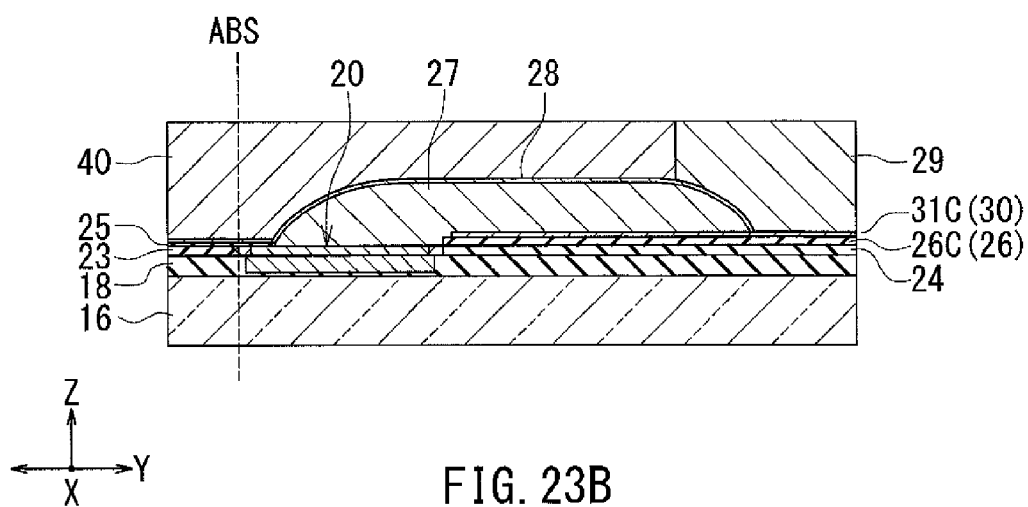

FIG. 23A and FIG. 23B show the next step. In this step, first, a seed layer (not illustrated) is formed on the separating film 28. Then, the main pole 40 is formed by plating, using the seed layer as an electrode and a seed. In the present embodiment, the main pole 40 is formed on the separating film 28 such that the first portion 41 is received in the receiving section 102. As a result, at least part of the first portion 41 is received in the recess 101. Then, a portion of the seed layer that is not covered with the main pole 40 is removed by, for example, IBE, using the main pole 40 as an etching mask. Then, the first nonmagnetic metal film (not illustrated) is formed to cover the main pole 40 and the separating film 28 by sputtering, for example. Then, the second heat sink 29 is thrilled on the first nonmagnetic metal film by frame plating or a lift-off process, for example.

Now, steps to follow the step shown in FIG. 23A and FIG. 23B will be described with reference to FIG. 6 and FIG. 7. First, the cladding layer 18, the dielectric layer 24 and the gap film 26 are selectively etched to form therein two openings for exposing the top surfaces of the second layers of the coupling sections 13A and 13B. Then, the third layers of the coupling sections 13A and 13B are formed on the second layers of the coupling sections 13A and 13B, respectively. Next, the dielectric layer 45 is formed over the entire top surface of the stack. The main pole 40, the third layers of the coupling sections 13A and 13B, the second heat sink 29, the dielectric layer 45 and the first nonmagnetic metal film are then polished by CMP, for example.

Next, the second nonmagnetic metal film (not illustrated) is formed on the second heat sink 29. Then, the coupling layer 46 is formed over the main pole 40, the dielectric layer 45 and the second nonmagnetic metal film, and the coupling layer 47 is formed over the third layers of the coupling sections 13A and 13B and the dielectric layer 45. Next, the dielectric layer 48 is formed over the entire top surface of the stack. The dielectric layer 48 is then polished by, for example, CMP, until the coupling layers 46 and 47 are exposed.

Next, the coupling layer 53 is formed on the coupling layer 46, and the coupling layer 54 is formed on the coupling layer 47. The insulating film 55 is then formed over the entire top surface of the stack. The first layer 51 of the coil 50 is then formed on the insulating film 55. Next, the insulating layer 56 is formed over the entire top surface of the stack. The insulating film 55 and the insulating layer 56 are then polished by, for example, CMP, until the coupling layers 53 and 54 and the first layer 51 are exposed.

Next, the insulating layer 57 is formed on the first layer 51 of the coil 50 and the insulating layer 56. Then, the coupling layer 58 is formed on the coupling layer 53, and the coupling layer 59 is formed on the coupling layer 54. Next, the insulating film 60 is formed over the entire top surface of the stack. The insulating layer 57 and the insulating film 60 are then selectively etched to form therein openings for exposing the coil connection 51E (see FIG. 8) of the first layer 51 of the coil 50. Then, the second layer 52 of the coil 50 is formed on the insulating film 60 and the coil connection 51E. Next, the insulating layer 61 is formed over the entire top surface of the stack. The insulating film 60 and the insulating layer 61 are then polished by, for example, CMP, until the coupling layers 58 and 59 and the second layer 52 are exposed.

Next, the insulating layer 62 is formed on the second layer 52 of the coil 50 and the insulating layer 61. The yoke layer 63 is then formed over the coupling layers 58 and 59 and the insulating layer 62. Next, the insulating layer 64 is formed over the entire top surface of the stack. The insulating layer 64 is then polished by, for example, CMP, until the yoke layer 63 is exposed. Then, the protective layer 65 is formed to cover the yoke layer 63 and the insulating layer 64. Wiring, terminals, and other components are then formed on the top surface of the protective layer 65. When the substructure is completed thus, the step of forming the medium facing surface 80 is performed. A protective film for covering the medium facing surface 80 may be formed thereafter. Being provided with the medium facing surface 80, each pre-head portion becomes a thermally-assisted magnetic recording head.

The step of forming the medium facing surface 80 includes the step of polishing the surface of each pre-head portion that has resulted from cutting the substructure, and the step of forming a rail on the polished surface for allowing the slider to fly.

The effects of the manufacturing method for the thermally-assisted magnetic recording head according to the present embodiment will now be described. As described previously, the first material portion 21 and the second material portion 22 of the plasmon generator 20 are formed of different materials. If the portions formed of different materials are simultaneously etched in the process of forming the plasmon generator 20, a difference in etching rate may cause the cladding layer 18 lying between the core 16 and the plasmon generator 2U to be over-etched to cause damage to the core 16. According to the present embodiment, in contrast, the initial second material portion 22P formed of a single material, i.e., the second material, is only etched when the initial plasmon generator 20P is etched into the plasmon generator 20. This allows for the formation of the second material portion 22 without any damage to the core 16 caused by over-etching of the cladding layer 18.

In the manufacturing method for the thermally-assisted magnetic recording head according to the present embodiment, the initial gap film 26P is formed to cover the plasmon generator 20 and the etching mask 81 after the step of etching the initial plasmon generator 20P, and the surrounding layer 30 is formed after the formation of the initial gap film 26P. The surrounding layer 30 is thus formed in a self-aligned manner to be in precise alignment with the plasmon generator 20. This brings the first and second surrounding layer end faces 30Aa and 30Ba into precise alignment with the near-field light generating surface 20a.

Further, according to the present embodiment, the removal step of removing a portion of the initial gap film 26P and at least a portion of the etching mask 81 is performed after the formation of the surrounding layer 30. The removal step makes the initial gap film 26P into the gap film 26 and results in the formation of a structure having the recess 101, the structure including the plasmon generator 20, the surrounding layer 30 and the gap film 26. The main pole 40 is formed such that at least part of the first portion 41 is received in the recess 101. The main pole 40 is thus formed in a self-aligned manner to be in precise alignment with the plasmon generator 20. This brings the first end face portion 41a into precise alignment with the near-field light generating surface 20a.

Further, the present embodiment makes it possible to adjust the space between the first and second surrounding layer end faces 30Aa and 30Ba by the width of the portion of each of the first and second gap film end faces 26Aa and 26Ba located between the first and second surrounding layer end faces 30Aa and 30Ba. The width of the portion of each of the first and second gap film end faces 26Aa and 26Ba can be adjusted by the thickness of the initial gap film 26P. The present embodiment thus allows for a desired sizing of the width of the first end face portion 41a without limitations imposed by the width of the near-field light generating surface 20a. Further, according to the present embodiment, since the space between the first and second surrounding layer end faces 30Aa and 30Ba is adjustable, it is possible to adjust the space between the first end face portion 41a and the first surrounding layer end face 30Aa and the space between the first end face portion 41a and the second surrounding layer end face 30Ba.

Second Embodiment

Figure 24:
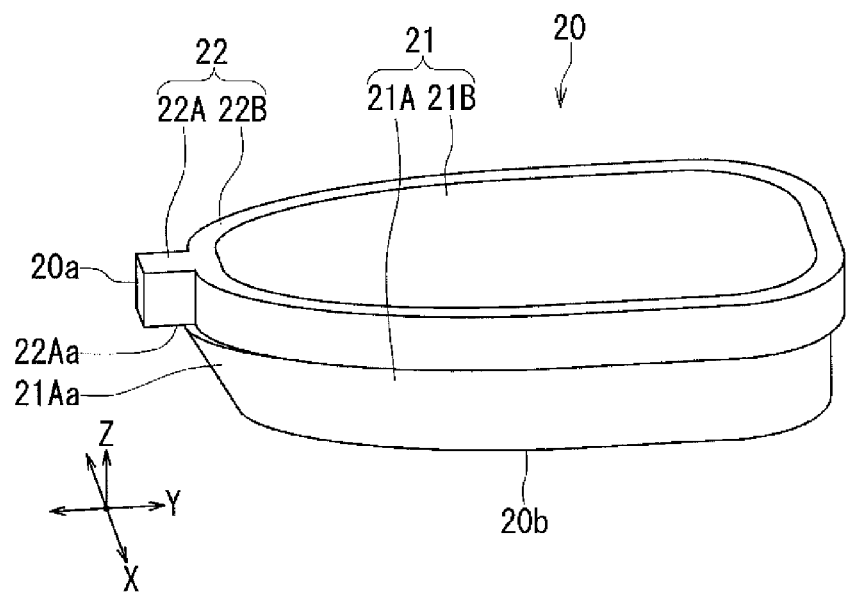
FIG. 24 is a perspective view showing a plasmon generator of a second embodiment of the invention.
Figure 25:
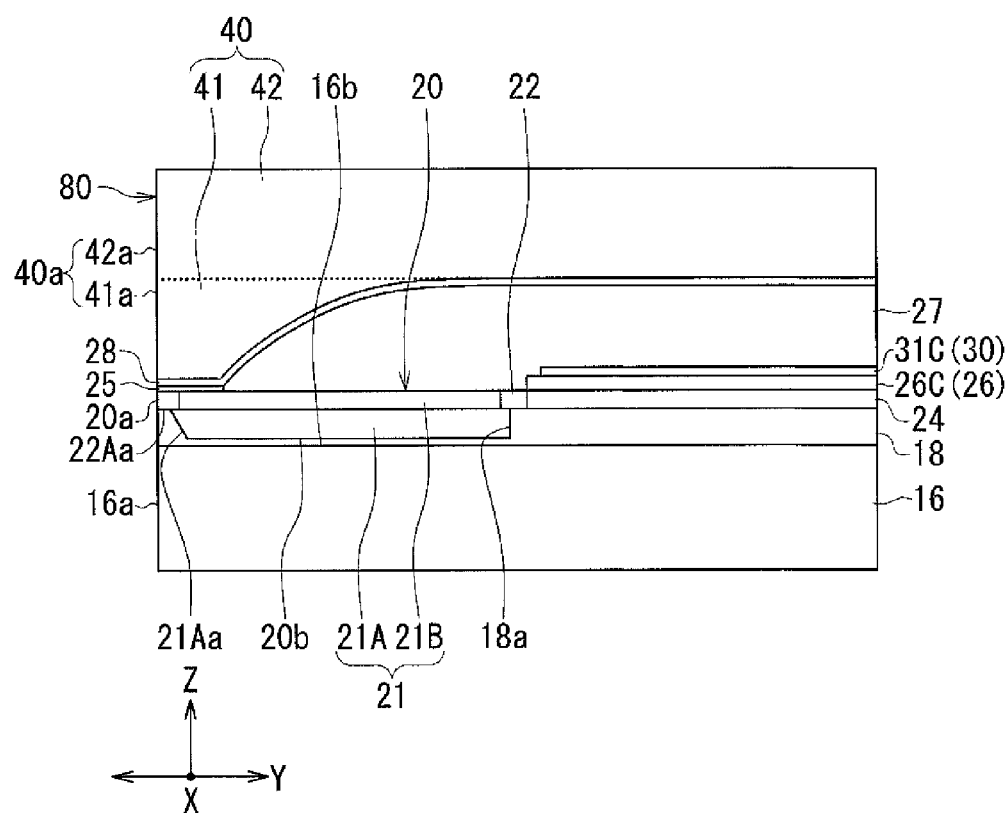
FIG. 25 is a cross-sectional view showing the main part of a thermally-assisted magnetic recording head according to the second embodiment of the invention.

A thermally-assisted magnetic recording head according to a second embodiment of the invention will now be described with reference to FIG. 24 and FIG. 25. FIG. 24 is a perspective view showing a plasmon generator of the present embodiment. FIG. 25 is a cross-sectional view showing the main part of the thermally-assisted magnetic recording head according to the present embodiment.

The thermally-assisted magnetic recording head according to the present embodiment is configured differently than in the first embodiment in the following ways. In the present embodiment, the dielectric layer 23 of the first embodiment is omitted. Further, the narrow portion 22A of the second material portion 22 of the plasmon generator 20 does not have the connecting surface 22Ab described in relation to the first embodiment. The bottom surface 22Aa of the narrow portion 22A is connected to the near-field light generating surface 20a. Further, the front end portion 21Aa of the first layer portion 21A of the first material portion 21 of the plasmon generator 20 is inclined with respect to the medium facing surface 80 such that the distance from the medium facing surface 80 to any point on the front end portion 21Aa decreases with decreasing distance from the point to the near-field light generating surface 20a.

The manufacturing method for the thermally-assisted magnetic recording head according to the present embodiment differs from the first embodiment as follows. According to the present embodiment, in the step of forming the receiving section 18a in the cladding layer 18 of the first embodiment (see FIG. 10A to FIG. 10C), the cladding layer 18 is taper-etched so that a portion of the receiving section 18a to contact the front end portion 21Aa of the first layer portion 21A is inclined. The step of forming the dielectric layer 23 and the step of etching the dielectric layer 23 (see FIG. 12A to FIG. 12C) are omitted in the present embodiment.

The remainder of configuration, function and effects of the present embodiment are similar to those of the first embodiment.

Third Embodiment

Figure 26:
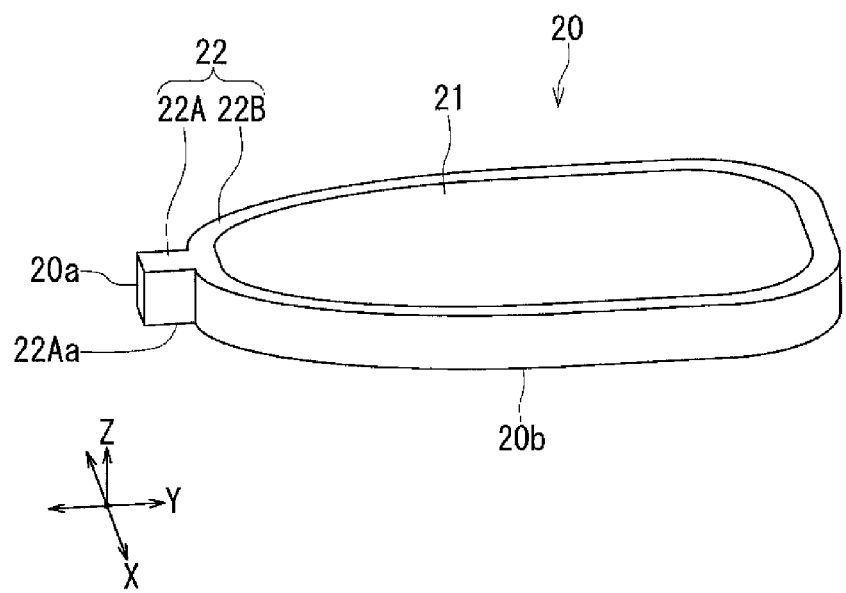
FIG. 26 is a perspective view showing a plasmon generator of a third embodiment of the invention.
Figure 27:
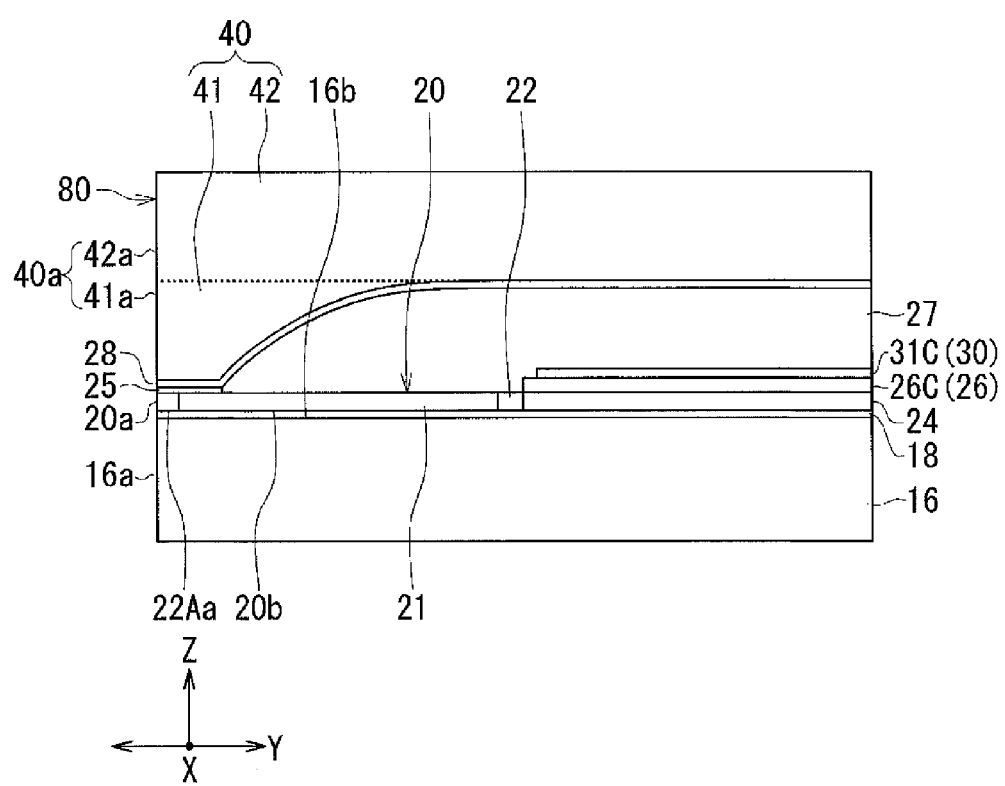
FIG. 27 is a cross-sectional view showing the main part of a thermally-assisted magnetic recording head according to the third embodiment of the invention.

A thermally-assisted magnetic recording head according to a third embodiment of the invention will now be described with reference to FIG. 26 and FIG. 27. FIG. 26 is a perspective view showing a plasmon generator of the present embodiment. FIG. 27 is a cross-sectional view showing the main part of the thermally-assisted magnetic recording head according to the present embodiment.

The thermally-assisted magnetic recording head according to the present embodiment is configured differently than in the second embodiment in the following ways. In the present embodiment, the entirety of the first material portion 21 of the plasmon generator 20 lies inside the ring portion 22B of the first material portion 22. In the present embodiment, the first layer portion 21A and the second layer portion 21B are omitted from the first material portion 21. Further, the cladding layer 18 does not have the receiving section 18a. The entirety of the plasmon generator 20 lies on the cladding layer 18. The cladding layer 18 has a smaller thickness than in the second embodiment by the height of the receiving section 18a.

The manufacturing method for the thermally-assisted magnetic recording head according to the present embodiment differs from the second embodiment as follows. According to the present embodiment, the formation of the cladding layer 18 is followed by the formation of an initial plasmon generator without performing the step of forming the receiving section 18a in the cladding layer 18 described in relation to the second embodiment. In the step of forming the initial plasmon generator, first formed is an initial second material portion which will later become the second material portion 22 of the plasmon generator 20. Then, an opening is formed in the initial second material portion. The opening will later become the inner part of the ring portion 22B. The first material portion 21 is then formed inside the opening of the initial second material portion. The initial plasmon generator is thereby completed.

The remainder of configuration, function and effects of the present embodiment are similar to those of the second embodiment.

Fourth Embodiment

Figure 28:
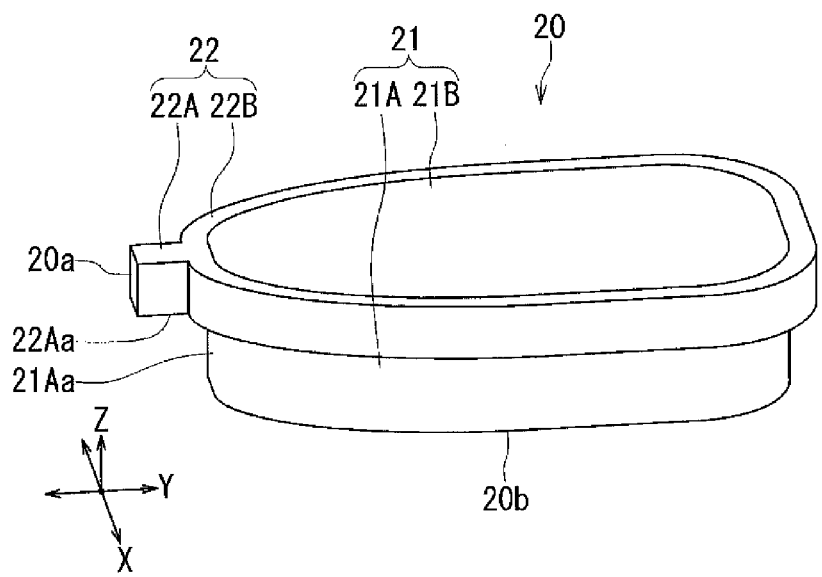
FIG. 28 is a perspective view showing a plasmon generator of a fourth embodiment of the invention.
Figure 29:
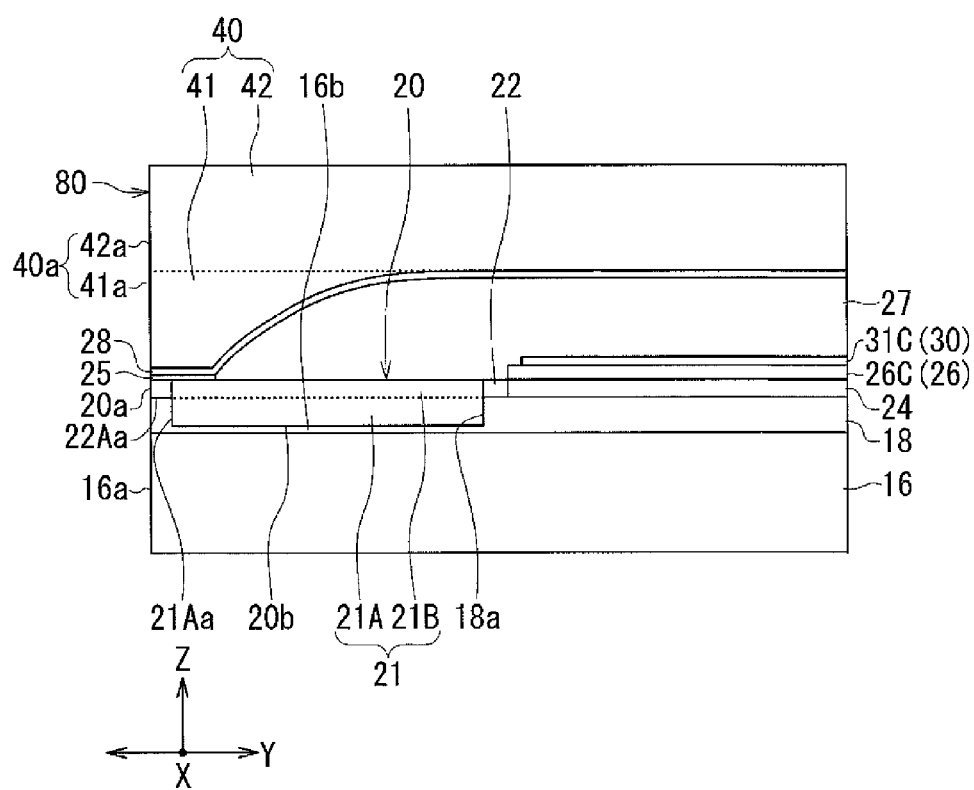
FIG. 29 is a cross-sectional view showing the main part of a thermally-assisted magnetic recording head according to the fourth embodiment of the invention.

A thermally-assisted magnetic recording head according to a fourth embodiment of the invention will now be described with reference to FIG. 28 and FIG. 29. FIG. 28 is a perspective view showing a plasmon generator of the present embodiment. FIG. 29 is a cross-sectional view showing the main part of the thermally-assisted magnetic recording head according to the present embodiment.

The thermally-assisted magnetic recording head according to the present embodiment is configured differently than in the second embodiment in the following ways. In the present embodiment, the first layer portion 21A and the second layer portion 21B of the first material portion 21 of the plasmon generator 20 have the same planar shape. In FIG. 29 the boundary between the first layer portion 21A and the second layer portion 21B is shown by a dotted line. In the present embodiment, the front end portion 21Aa of the first layer portion 21A of the first material portion 21 of the plasmon generator 20 is parallel to the medium facing surface 80 as in the first embodiment.

The manufacturing method for the thermally-assisted magnetic recording head according to the present embodiment differs from the second embodiment as follows. According to the present embodiment, the step of forming the receiving section 18a in the cladding layer 18 is performed during the process of formation of the initial plasmon generator. The process of formation of the initial plasmon generator will now be described. First, an initial second material portion, which will later become the second material portion 22 of the plasmon generator 20, is formed on the cladding layer 18 before the formation of the receiving section 18a therein. Then, an opening is formed in the initial second material portion. The opening will later become the inner part of the ring portion 22B. Subsequently, the receiving section 18a is formed in the cladding layer 18. The first material portion 21 is then formed in the receiving section 18a and the aforementioned opening. The initial plasmon generator is thereby completed. A part of the first material portion 21 formed in the receiving section 18a makes the first layer portion 21A. The other part of the first material portion 21 formed in the aforementioned opening makes the second layer portion 21B.

The remainder of configuration, function and effects of the present embodiment are similar to those of the second embodiment.

Fifth Embodiment

Figure 30:
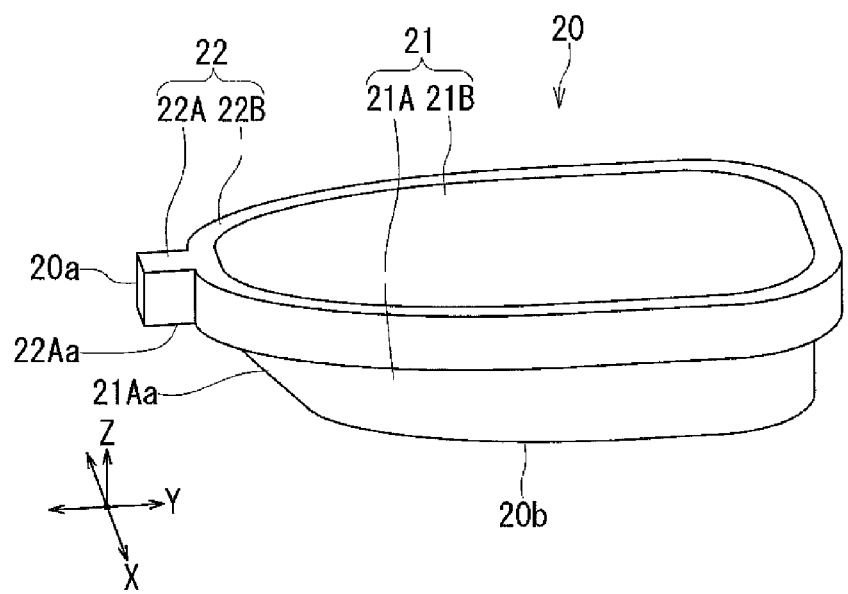
FIG. 30 is a perspective view showing a plasmon generator of a fifth embodiment of the invention.
Figure 31:
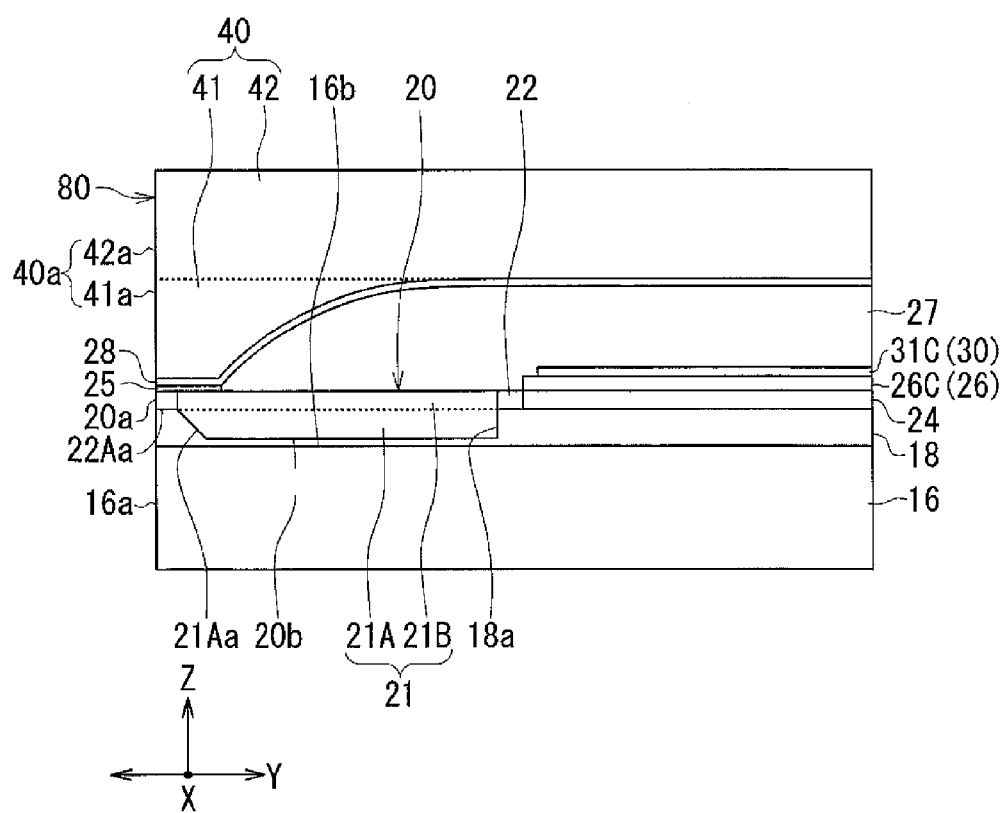
FIG. 31 is a cross-sectional view showing the main part of a thermally-assisted magnetic recording head according to the fifth embodiment of the invention.

A thermally-assisted magnetic recording head according to a fifth embodiment of the invention will now be described with reference to FIG. 30 and FIG. 31. FIG. 30 is a perspective view showing a plasmon generator of the present embodiment. FIG. 31 is a cross-sectional view showing the main part of the thermally-assisted magnetic recording head according to the present embodiment.

The thermally-assisted magnetic recording head according to the present embodiment is configured differently than in the fourth embodiment in the following ways. In the present embodiment, the front end portion 21Aa of the second layer portion 21B of the first material portion 21 of the plasmon generator 20 is inclined with respect to the medium facing surface 80 as in the second embodiment.

The remainder of configuration, function and effects of the present embodiment are similar to those of the fourth embodiment.

Sixth Embodiment

Figure 32:
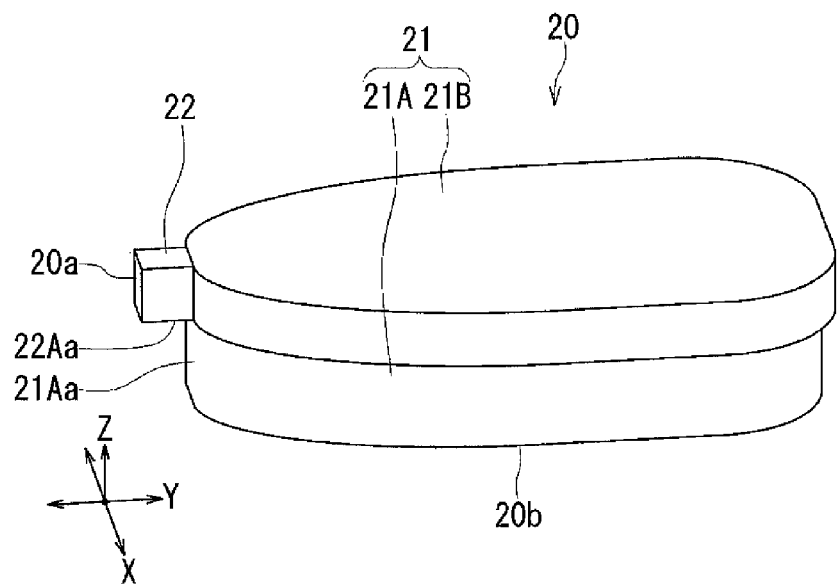
FIG. 32 is a perspective view showing a plasmon generator of a sixth embodiment of the invention.
Figure 33:
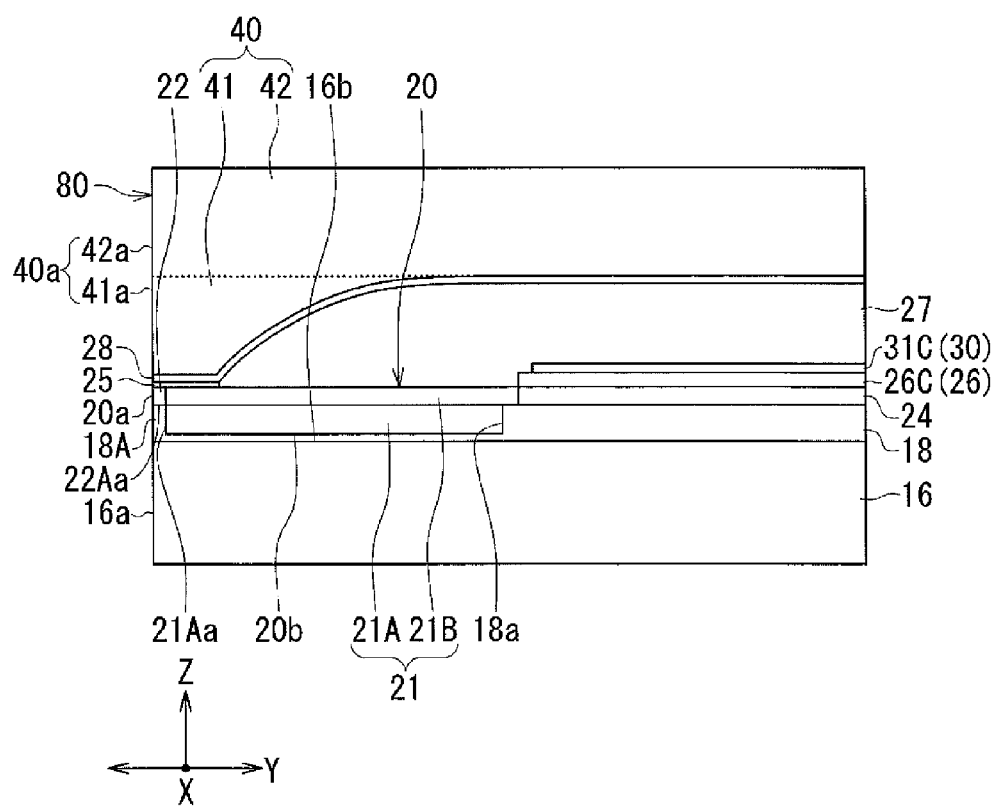
FIG. 33 is a cross-sectional view showing the main part of a thermally-assisted magnetic recording head according to the sixth embodiment of the invention.

A thermally-assisted magnetic recording head according to a sixth embodiment of the invention will now be described with reference to FIG. 32 and FIG. 33. FIG. 32 is a perspective view showing a plasmon generator of the present embodiment. FIG. 33 is a cross-sectional view showing the main part of the thermally-assisted magnetic recording head according to the present embodiment.

The thermally-assisted magnetic recording head according to the present embodiment is configured differently than in the second embodiment in the following ways. The thermally-assisted magnetic recording head according to the present embodiment includes an insulating section formed of an insulating material and located between the first layer portion 21A of the first material portion 21 and the medium facing surface 80. The insulating section is constituted by a portion of the cladding layer 18 that lies between the first layer portion 21A and the medium facing surface 80. The insulating section will be denoted by symbol 18A.

Further, in the present embodiment, the narrow portion 22A and the ring portion 22B are omitted from the second material portion 22 of the plasmon generator 20. The shape and location of the second material portion 22 of the present embodiment are basically the same as those of the narrow portion 22A of the second embodiment. The second material portion 22 is located between the second layer portion 21B of the first material portion 21 of the plasmon generator 20 and the medium facing surface 80. The insulating section 18A and the second material portion 22 are arranged in this order along the direction of travel of the recording medium 90 (the Z direction). The second material portion 22 is smaller than the second layer portion 21B in maximum width in the track width direction (the X direction).

Figure 34:
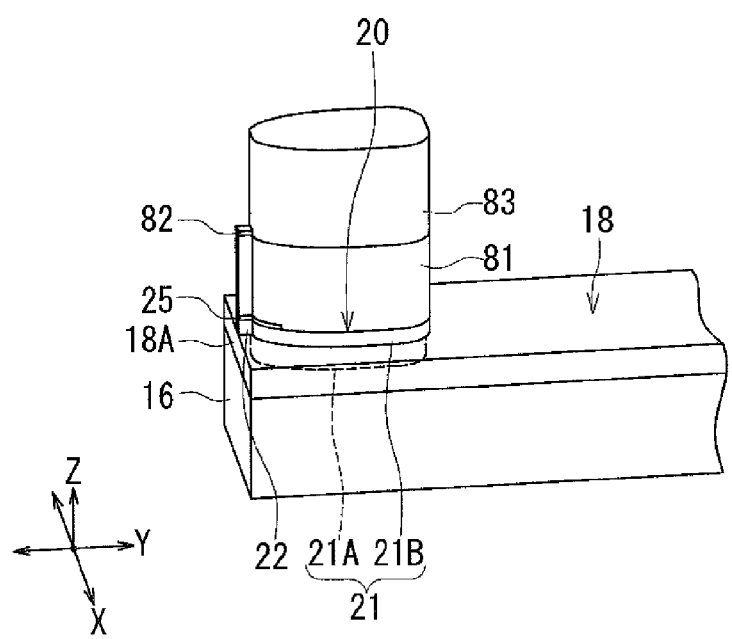
FIG. 34 is a perspective view showing a step of a manufacturing method for the thermally-assisted magnetic recording head according to the sixth embodiment of the invention.

A manufacturing method for the thermally-assisted magnetic recording head according to the present embodiment will now be described with reference to FIG. 34. FIG. 34 shows a stack of layers formed in the process of manufacturing the thermally-assisted magnetic recording head. The manufacturing method for the thermally-assisted magnetic recording head according to the present embodiment is the same as the method according to the first embodiment up to the step shown in FIG. 11A to FIG. 11C. FIG. 34 shows the next step. In this step, an initial second material portion, which will later become the second material portion 22, is first formed selectively on a part of the top surface of the cladding layer 18 that lies at the location ABS at which the medium facing surface 80 is to be formed and its vicinity. Then, an initial second layer portion, which will later become the second layer portion 21B of the first material portion 21, is formed on the cladding layer 18 and the first layer portion 21A of the first material portion 21. The initial plasmon generator of the present embodiment is thereby completed. The initial plasmon generator of the present embodiment includes an initial first material portion and the initial second material portion. The initial first material portion includes the first layer portion 21A and the initial second layer portion.

Next, the insulating film 25, the etching mask 81, the partial mask layer 82 and the photoresist mask 83 are formed on the initial plasmon generator. The initial plasmon generator and the insulating film 25 are then etched by, for example, IBE, using the etching mask 81. Specifically, the etching of the initial plasmon generator is to etch the initial second layer portion of the initial first material portion and the initial second material portion so that the initial second layer portion of the initial first material portion becomes the second layer portion 21B of the first material portion 21 and the initial second material portion becomes the second material portion 22. As a result of the etching, the initial plasmon generator becomes the plasmon generator 20. The subsequent steps are the same as those in the first embodiment.

In the present embodiment, the insulating section 18A and the second material portion 22 are arranged in this order along the direction of travel of the recording medium 90 (the Z direction). In other words, the insulating section 18A lies under the second material portion 22. This allows for the formation of the second material portion 22 of a narrow width without causing any damage to the core 16 even if there is a difference in etching rate between the initial second layer of the initial first material portion and the initial second material portion when etching the initial plasmon generator.

The remainder of configuration, function and effects of the present embodiment are similar to those of the first or second embodiment.

Seventh Embodiment

Figure 35:
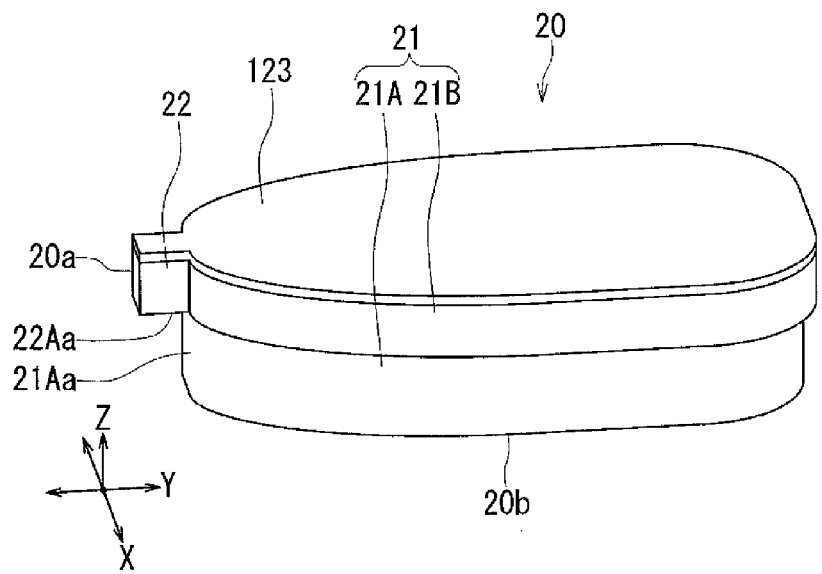
FIG. 35 is a perspective view showing a plasmon generator of a seventh embodiment of the invention.
Figure 36:
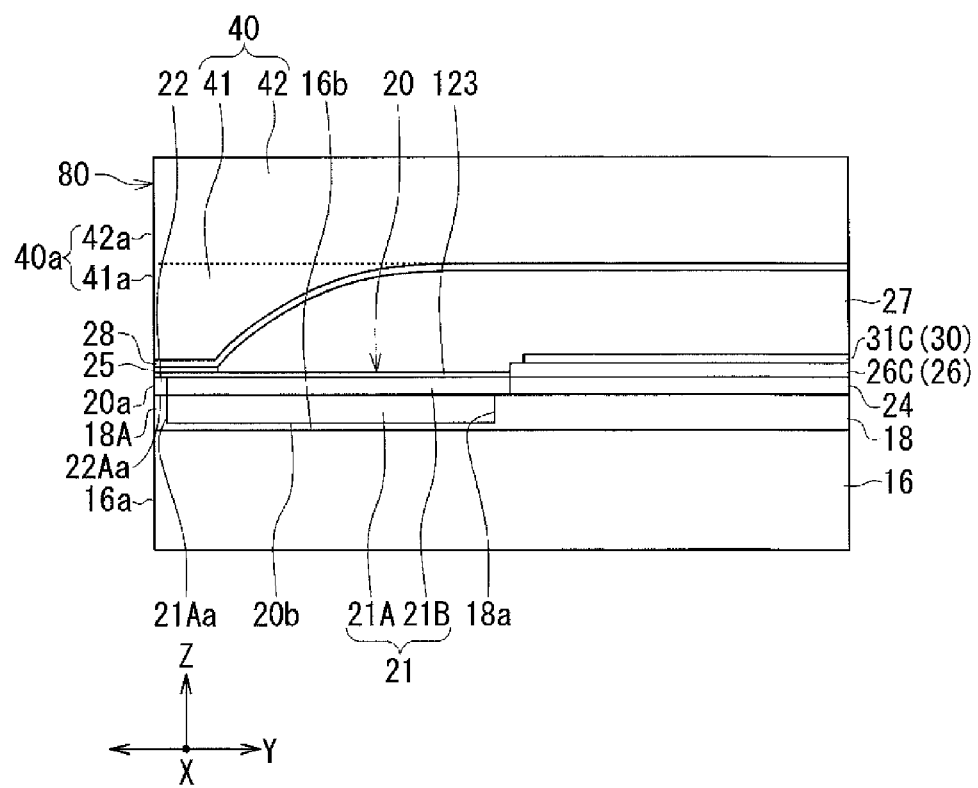
FIG. 36 is a cross-sectional view showing the main part of a thermally-assisted magnetic recording head according to the seventh embodiment of the invention.

A thermally-assisted magnetic recording head according to a seventh embodiment of the invention will now be described with reference to FIG. 35 and FIG. 36. FIG. 35 is a perspective view showing a plasmon generator of the present embodiment. FIG. 36 is a cross-sectional view showing the main part of the thermally-assisted magnetic recording head according to the present embodiment.

The thermally-assisted magnetic recording head according to the present embodiment is configured differently than in the sixth embodiment in the following ways. The plasmon generator 20 of the present embodiment includes a third material portion 123 in addition to the first and second material portions 21 and 22. The third material portion 123 is formed of a third material different from the first material. The third material portion 123 is located on the trailing side, i.e., the front side in the direction of travel of the recording medium 90, relative to the first and second material portions 21 and 22. The planar shape of the third material portion 123 is the same as the planar shape of the first and second material portions 21 and 22 in combination.

The third material is a metal material having a Vickers hardness higher than that of the first material. The third material may be the same as or different from the second material. The third material may be Ru or Rh, for example.

The manufacturing method for the thermally-assisted magnetic recording head according to the present embodiment differs from the sixth embodiment as follows. According to the present embodiment, the formation of the initial second layer portion is followed by the formation of an initial third material portion which will later become the third material portion. The initial plasmon generator of the present embodiment is thereby completed. The initial plasmon generator of the present embodiment includes the initial first material portion, the initial second material portion, and the initial third material portion. The initial first material portion includes the first layer portion 21A and the initial second layer portion. In the step of etching the initial plasmon generator, the initial second layer portion of the initial first material portion, the initial second material portion and the initial third material portion are etched so that the initial second layer portion of the initial first material portion becomes the second layer portion 21B of the first material portion 21, the initial second material portion becomes the second material portion 22, and the initial third material portion becomes the third material portion 123.

The remainder of configuration, function and effects of the present embodiment are similar to those of the sixth embodiment.

Eighth Embodiment

Figure 37:
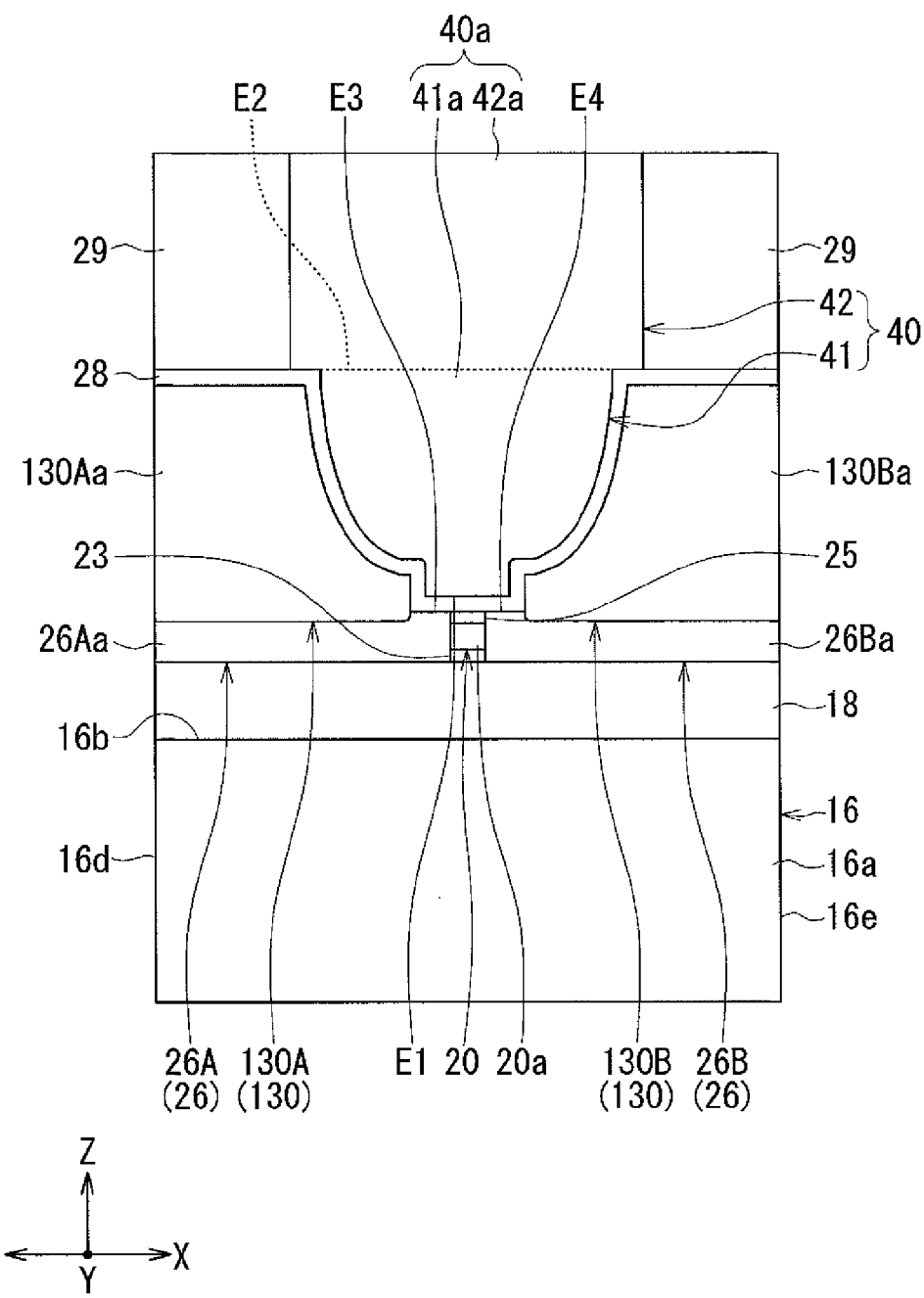
FIG. 37 is a front view showing the main part of a thermally-assisted magnetic recording head according to an eighth embodiment of the invention.
Figure 38:
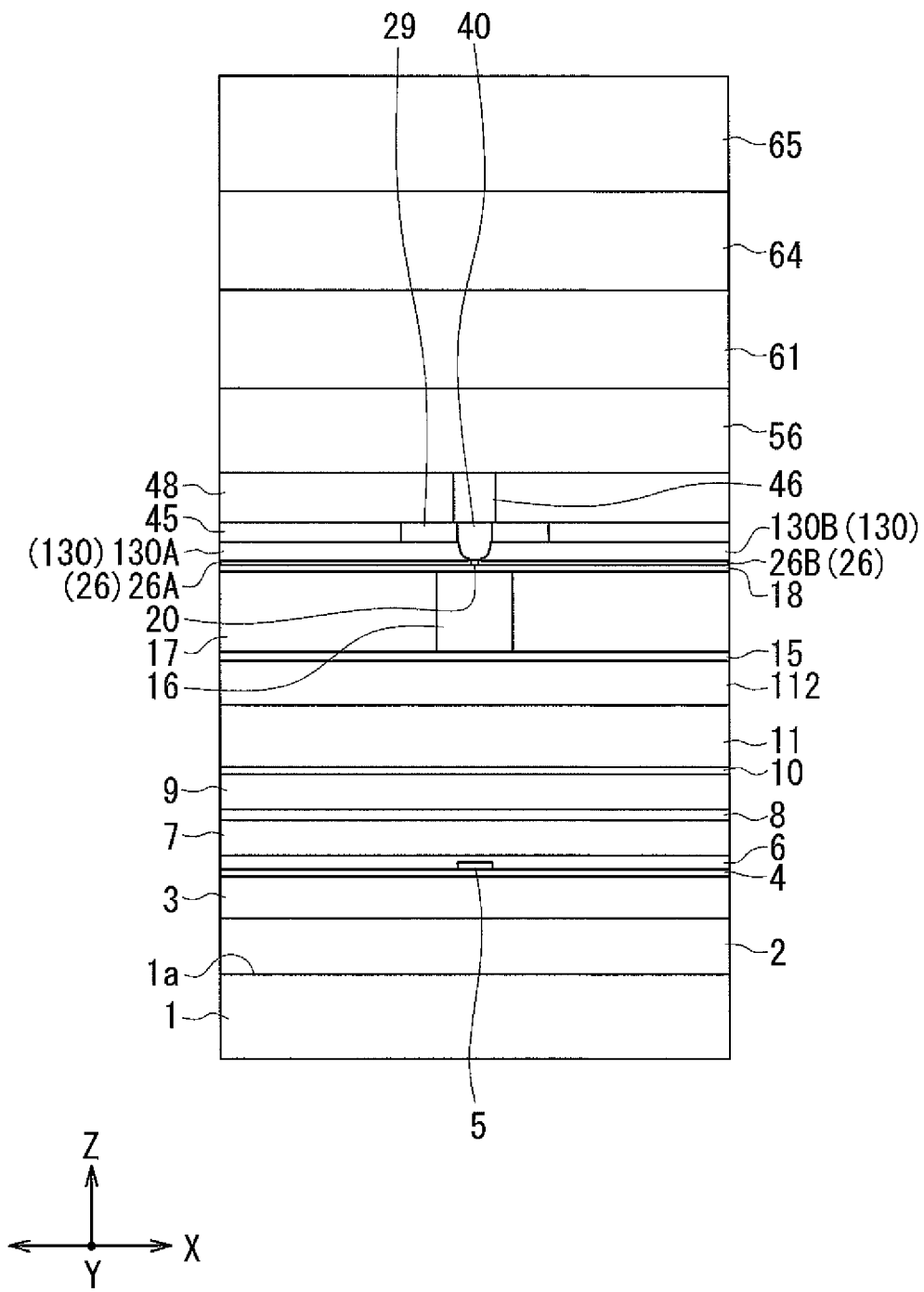
FIG. 38 is a front view showing the medium facing surface of the thermally-assisted magnetic recording head according to the eighth embodiment of the invention.

A thermally-assisted magnetic recording head according to an eighth embodiment of the invention will now be described with reference to FIG. 37 and FIG. 38. FIG. 37 is a front view showing the main part of the thermally-assisted magnetic recording head according to the present embodiment. FIG. 38 is a front view showing the medium facing surface of the thermally-assisted magnetic recording head according to the present embodiment.

The thermally-assisted magnetic recording head according to the present embodiment is configured differently than in the first embodiment in the following ways. The thermally-assisted magnetic recording head according to the present embodiment includes a surrounding layer 130 in place of the surrounding layer 30 of the first embodiment. The surrounding layer 130 is formed of a nonmagnetic metal material. The nonmagnetic metal material for use to form the surrounding layer 130 may be Ni, Cr, Ta, Ru, Rh or Rd, for example. The surrounding layer 130 has the function of dissipating heat generated by the plasmon generator 20 outwardly from the plasmon generator 20 and the main pole 40.

The surrounding layer 130 includes a first side portion 130A and a second side portion 130B. The first side portion 130A lies on the first portion 26A of the gap film 26. The second side portion 130B lies on the second portion 26B of the gap film 26. The first side portion 130A has a first surrounding layer end face 130Aa located in the medium facing surface 80. The second side portion 130B has a second surrounding layer end face 130Ba located in the medium facing surface 80. Since the first and second side portions 130A and 130B are portions of the surrounding layer 130, the surrounding layer 130 can be said to have the first and second surrounding layer end faces 130Aa and 130Ba. The first surrounding layer end face 130Aa and the second surrounding layer end face 130Ba are located on opposite sides of at least part of the first end face portion 41a of the front end face 40a of the main pole 40 in the track width direction (the X direction) so that the at least part of the first end face portion 41a is interposed between the first and second surrounding layer end faces 130Aa and 130Ba.

As has been described in relation to the first embodiment, the first gap film end face 26Aa of the gap film 26 has the top edge E3 located at its front-side end in the direction of travel of the recording medium 90 (the Z direction). The second gap film end face 26Ba of the gap film 26 has the top edge E4 located at its front-side end in the direction of travel of the recording medium 90. The top edges E3 and E4 are interposed between the first and second surrounding layer end faces 130Aa and 130Ba and are located on the rear side in the direction of travel of the recording medium 90 relative to the first edge E1 of the first end face portion 41a. Thus, each of the first and second gap film end faces 26Aa and 26Ba includes a portion located between the first and second surrounding layer end faces 130Aa and 130Ba, but does not include any portion interposed between the first surrounding layer end face 130Aa and the first end face portion 41a or between the second surrounding layer end face 130Ba and the first end face portion 41a.

Further, in the present embodiment, the coupling layers 12, 19A and 19B are omitted. Instead, the thermally-assisted magnetic recording head according to the present embodiment includes a shield 112 formed of a magnetic material. The shape and location of the shield 112 are the same as those of the coupling layer 12 of the first embodiment. The shield 112 has an end face located in the medium facing surface 80. The shield 112 captures a disturbance magnetic field applied to the thermally-assisted magnetic recording head from the outside thereof. This makes it possible to prevent the disturbance magnetic field from being intensively captured into the main pole 40 and thereby causing erroneous writing on the recording medium 90. The shield 112 also has the function of capturing a magnetic flux that is produced from the front end face 40a of the main pole 40 and spreads in directions other than the direction perpendicular to the plane of the recording medium 90, and thereby preventing the magnetic flux from reaching the recording medium 90. It is thereby possible to increase the gradient of strength of the write magnetic field. Further, the shield 112 and the return path section R have the function of allowing a magnetic flux that has been produced from the front end face 40a of the main pole 40 and has magnetized a portion of the recording medium 90 to flow back to the main pole 40.

The manufacturing method for the thermally-assisted magnetic recording head according to the present embodiment differs from the first embodiment as follows. According to the present embodiment, the shield 112 is formed in place of the coupling layer 12. The step of forming the coupling layers 19A and 19B is omitted. Further, an initial surrounding layer, which will later become the surrounding layer 130, is formed in place of the nonmagnetic film 31P (see FIG. 16A and FIG. 16B) and the magnetic layer 32P (see FIG. 17A and FIG. 17B). The initial surrounding layer is formed to cover the initial gap film 26P (see FIG. 16A to FIG. 17B).

The plasmon generator 20 of the present embodiment may have a configuration the same as that of the plasmon generator 20 of not only the first embodiment but also any of the second to seventh embodiments.

The remainder of configuration, function and effects of the present embodiment are similar to those of any of the first to seventh embodiments.

The present invention is not limited to the foregoing embodiments, and various modifications may be made thereto. For example, as far as the requirements of the appended claims are met, the main pole 40, the plasmon generator 20, the surrounding layer 30 or 130, the gap film 26 and the separating film 28 may be shaped and located as desired, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A thermally-assisted magnetic recording head comprising:
 a medium facing surface configured to face a recording medium;
 a main pole for producing a write magnetic field for use to write data on the recording medium;
 a waveguide including a core and a cladding, the core allowing light to propagate therethrough, the cladding being provided around the core;
 a plasmon generator having a near-field light generating surface located in the medium facing surface;
 a surrounding layer; and
 a gap film for separating the plasmon generator from the surrounding layer, wherein
 the plasmon generator includes a first material portion formed of a first material, and a second material portion formed of a second material different from the first material,
 the first material portion is located away from the medium facing surface,
 the second material portion includes the near-field light generating surface,
 the plasmon generator is configured to excite a surface plasmon on the first material portion based on the light propagating through the core, and to generate near-field light from the near-field light generating surface based on the surface plasmon,
 the main pole has a front end face located in the medium facing surface,
 the front end face includes a first end face portion, and a second end face portion contiguous with the first end face portion,
 the second end face portion is greater than the first end face portion in width in a track width direction,
 the near-field light generating surface, the first end face portion and the second end face portion are arranged in this order along a direction of travel of the recording medium,
 the main pole includes a first portion and a second portion, the first portion including the first end face portion, the second portion including the second end face portion, the surrounding layer has a first surrounding layer end face and a second surrounding layer end face, both located in the medium facing surface, the first surrounding layer end face and the second surrounding layer end face are located on opposite sides of at least part of the first end face portion in the track width direction so that the at least part of the first end face portion is interposed between the first and second surrounding layer end faces, the gap film has a first gap film end face and a second gap film end face, both located in the medium facing surface, the first gap film end face and the second gap film end face are located on opposite sides of at least part of the near-field light generating surface in the track width direction so that the at least part of the near-field light generating surface is interposed between the first and second gap film end faces, and each of the first and second gap film end faces includes a portion located between the first and second surrounding layer end faces, but does not include any portion interposed between the first surrounding layer end face and the first end face portion or between the second surrounding layer end face and the first end face portion.

2. The thermally-assisted magnetic recording head according to claim 1, wherein the first material is one of Ag, Au, Al and Cu, and the second material is a metal material having a Vickers hardness higher than that of the first material.

3. The thermally-assisted magnetic recording head according to claim 1, wherein the second material portion includes a ring portion shaped like a ring, and a narrow portion protruding from the ring portion, the ring portion is located away from the medium facing surface, the narrow portion includes the near-field light generating surface, the narrow portion is smaller than the ring portion in maximum width in the track width direction, and at least part of the first material portion lies inside the ring portion.

4. The thermally-assisted magnetic recording head according to claim 3, wherein the first material portion includes a first layer portion and a second layer portion, the core, the first layer portion and the second layer portion are arranged in this order along the direction of travel of the recording medium, and the second layer portion lies inside the ring portion.

5. The thermally-assisted magnetic recording head according to claim 1, further comprising an insulating section formed of an insulating material, wherein the first material portion includes a first layer portion and a second layer portion, the core, the first layer portion and the second layer portion are arranged in this order along the direction of travel of the recording medium, the insulating section is located between the first layer portion and the medium facing surface, the second material portion is located between the second layer portion and the medium facing surface, the insulating section and the second material portion are arranged in this order along the direction of travel of the recording medium, and the second material portion is smaller than the second layer portion in maximum width in the track width direction.

6. The thermally-assisted magnetic recording head according to claim 1, further comprising a separating film for separating the main pole from the surrounding layer, wherein the separating film is a single continuous film, and at least part of the separating film is interposed between the main pole and the plasmon generator, between the main pole and the surrounding layer, and between the main pole and the gap film.

7. The thermally-assisted magnetic recording head according to claim 1, wherein the surrounding layer is formed of a nonmagnetic metal material.

8. The thermally-assisted magnetic recording head according to claim 1, wherein the surrounding layer includes a first side shield and a second side shield each formed of a magnetic material, the first side shield has a first side shield end face constituting at least part of the first surrounding layer end face, and the second side shield has a second side shield end face constituting at least part of the second surrounding layer end face.

9. The thermally-assisted magnetic recording head according to claim 1, wherein the core has an evanescent light generating surface for generating evanescent light based on the light propagating through the core, the first material portion has a plasmon exciting section located at a predetermined distance from the evanescent light generating surface and facing the evanescent light generating surface, in the plasmon generator, the surface plasmon is excited on the plasmon exciting section through coupling with the evanescent light generated by the evanescent light generating surface, the surface plasmon propagates to the near-field light generating surface, and the near-field light generating surface generates near-field light based on the surface plasmon.

10. The thermally-assisted magnetic recording head according to claim 1, wherein the front end face of the main pole is located on a front side in the direction of travel of the recording medium relative to the near-field light generating surface.

11. A manufacturing method for the thermally-assisted magnetic recording head of claim 1, comprising the steps of:
forming the waveguide;
forming the plasmon generator;
forming the surrounding layer and the gap film after the plasmon generator is formed; and
forming the main pole after the surrounding layer and the gap film are formed, wherein
the step of forming the plasmon generator includes the steps of:
  forming an initial plasmon generator;
  forming an etching mask for use to pattern the initial plasmon generator; and
  etching the initial plasmon generator by using the etching mask so that the initial plasmon generator becomes the plasmon generator,
the step of forming the surrounding layer and the gap film includes:
  the step of forming an initial gap film to cover the plasmon generator and the etching mask after the step of etching the initial plasmon generator;

the step of forming the surrounding layer after the initial gap film is formed; and the removal step of removing a portion of the initial gap film and at least a portion of the etching mask after the surrounding layer is formed, the removal step makes the initial gap film into the gap film and results in the formation of a structure having a recess, the structure including the plasmon generator, the surrounding layer and the gap film, and the main pole is formed such that at least part of the first portion is received in the recess.

12. The manufacturing method according to claim 11, wherein the second material portion includes a ring portion shaped like a ring, and a narrow portion protruding from the ring portion, the ring portion is located away from the medium facing surface, the narrow portion includes the near-field light generating surface, the narrow portion is smaller than the ring portion in maximum width in the track width direction, at least part of the first material portion lies inside the ring portion, the initial plasmon generator includes the first material portion and an initial second material portion, and in the step of etching the initial plasmon generator, the initial second material portion is etched by using the etching mask so that the initial second material portion becomes the second material portion.

13. The manufacturing method according to claim 11, wherein the thermally-assisted magnetic recording head further comprises an insulating section formed of an insulating material, the first material portion includes a first layer portion and a second layer portion, the core, the first layer portion and the second layer portion are arranged in this order along the direction of travel of the recording medium, the insulating section is located between the first layer portion and the medium facing surface, the second material portion is located between the second layer portion and the medium facing surface, the insulating section and the second material portion are arranged in this order along the direction of travel of the recording medium, the second material portion is smaller than the second layer portion in maximum width in the track width direction, the initial plasmon generator includes an initial first material portion and an initial second material portion, and in the step of etching the initial plasmon generator, the initial first material portion and the initial second material portion are etched by using the etching mask so that the initial first material portion becomes the first material portion and the initial second material portion becomes the second material portion.

14. The manufacturing method according to claim 11, wherein the thermally-assisted magnetic recording head further comprises a separating film for separating the main pole from the surrounding layer, the separating film being a single continuous film, at least part of the separating film being interposed between the main pole and the plasmon generator, between the main pole and the surrounding layer, and between the main pole and the gap film, and the manufacturing method further comprises the step of forming the separating film on the structure after the removal step such that the separating film forms a receiving section corresponding to the recess, and the main pole is formed on the separating film such that the first portion is received in the receiving section after the step of forming the separating film.

15. The manufacturing method according to claim 11, wherein the removal step employs wet etching to remove the portion of the initial gap film.

16. The manufacturing method according to claim 11, wherein the step of forming the surrounding layer includes the steps of: forming an initial surrounding layer to cover the initial gap film; and polishing the initial surrounding layer until the etching mask is exposed.

17. The manufacturing method according to claim 16, wherein the step of forming the surrounding layer further includes the step of etching a portion of the initial surrounding layer after the step of polishing the initial surrounding layer.

* * * * *